United States Patent [19]

Itoh et al.

[11] Patent Number: 5,513,042
[45] Date of Patent: Apr. 30, 1996

[54] LENS SYSTEM WITH MASTER LENS SYSTEM AND CONVERSION LENS

[75] Inventors: Masami Itoh, Higashi Kurume; Shuichi Kikuchi, Yokohama, both of Japan

[73] Assignee: Ricoh Company, Ltd., Tokyo, Japan

[21] Appl. No.: 254,565

[22] Filed: Jun. 6, 1994

[30] Foreign Application Priority Data

Jun. 29, 1993 [JP] Japan .................. 5-159743

[51] Int. Cl.$^6$ .................................. G02B 15/02
[52] U.S. Cl. .................. 359/674; 359/756; 359/757
[58] Field of Search .......................... 359/674, 756, 359/757

[56] References Cited

U.S. PATENT DOCUMENTS

| 4,368,956 | 1/1983 | Yamada et al. | 359/715 |
|---|---|---|---|
| 4,596,447 | 6/1986 | Yamada et al. | 359/674 |
| 4,708,442 | 11/1987 | Fujii et al. | 359/674 |

*Primary Examiner*—Georgia Y. Epps
*Assistant Examiner*—Dawn-Marie Bey
*Attorney, Agent, or Firm*—Oblon, Spivak, McClelland, Maier & Neustadt

[57] ABSTRACT

A lens system includes a master lens system and a conversion lens system. The master lens system has a first lens, a second lens, a third lens, and a fourth lens, which are sequentially arranged from an object side of the lens system to an image side thereof, and has a first diaphragm which is arranged between the third lens and the fourth lens. The first lens is a positive meniscus lens having a convex surface toward the object side. The second lens is a negative lens. The third lens is a positive lens. The fourth lens is a negative meniscus lens having a concave surface toward the object side. The conversion lens system is arranged in such a manner that the conversion lens system can be freely inserted and removed between the third lens and the fourth lens of the master lens system. When the conversion lens system is inserted and removed between the third lens and the fourth lens, relative positions of the respective first, second, third and fourth lenses are fixed, and a focal length of the lens system becomes shorter than a focal length of the master lens system.

12 Claims, 14 Drawing Sheets

SPHERICAL
ABERRATION (SA)
SINE CONDITION (SC)

ASTIGMATISM

DISTORTION
ABERRATION
(%) *FIG. 5c*

SPHERICAL
ABERRATION (SA)
SINE CONDITION (SC)

ASTIGMATISM

DISTORTION
ABERRATION
(%) *FIG. 5g*

SPHERICAL
ABERRATION (SA)
SINE CONDITION (SC)

ASTIGMATISM

DISTORTION
ABERRATION
(%) *FIG. 6c*

MERIDIONAL
COMATIC
ABERRATION

SPHERICAL
ABERRATION (SA)
SINE CONDITION (SC)

ASTIGMATISM

DISTORTION
ABERRATION
(%) *FIG. 6g*

MERIDIONAL
COMATIC
ABERRATION

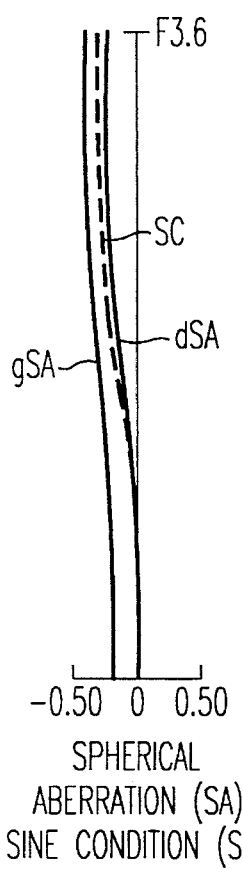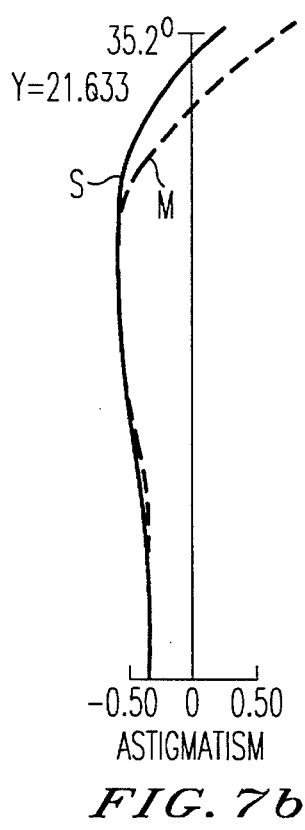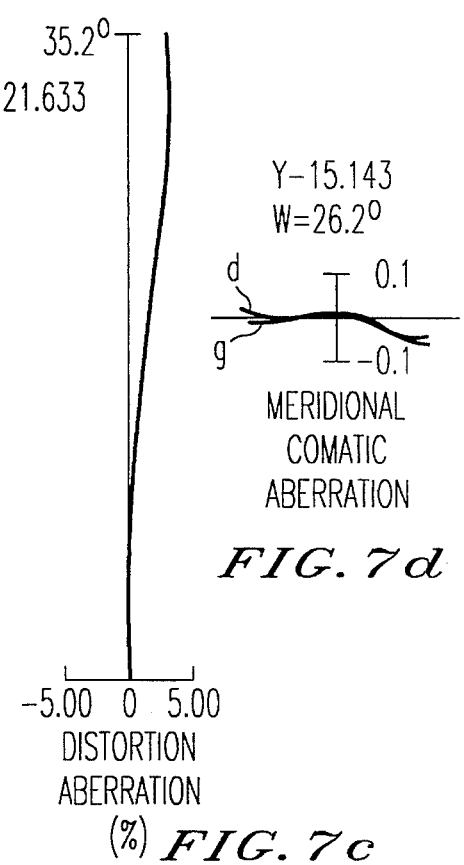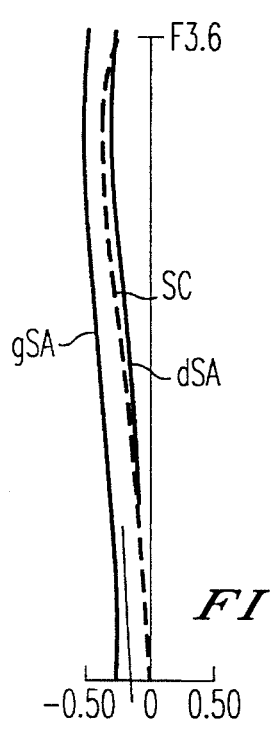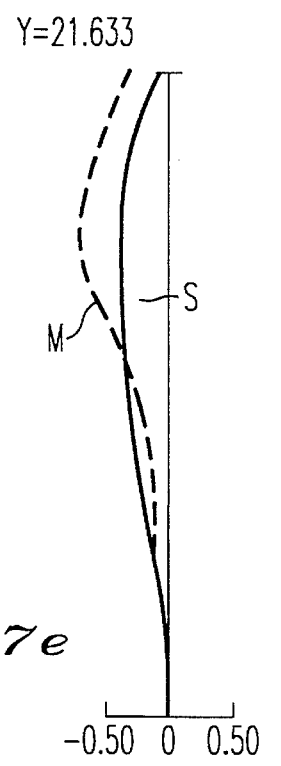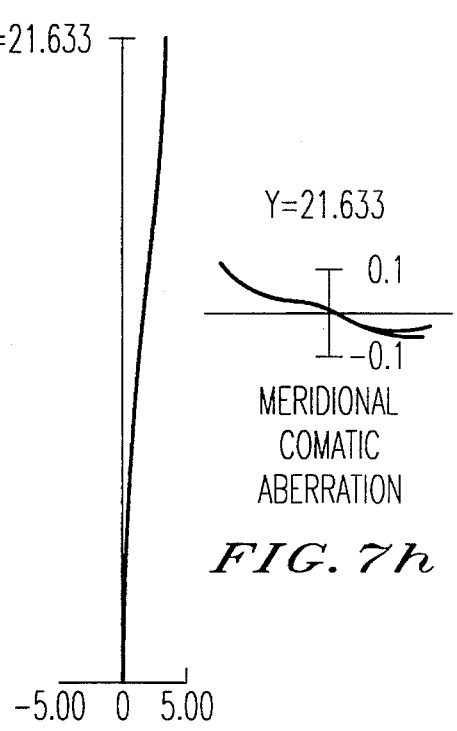
FIG. 7a  FIG. 7b  FIG. 7c  FIG. 7d
FIG. 7e  FIG. 7f  FIG. 7g  FIG. 7h

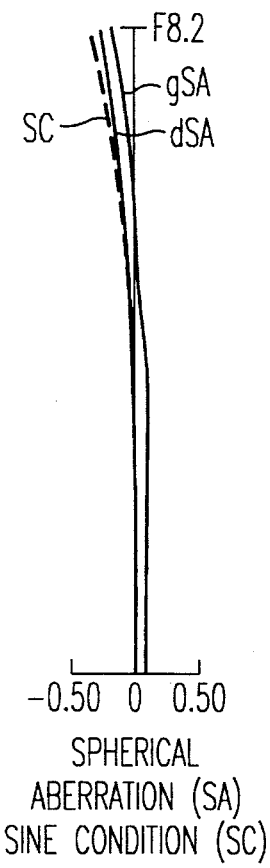
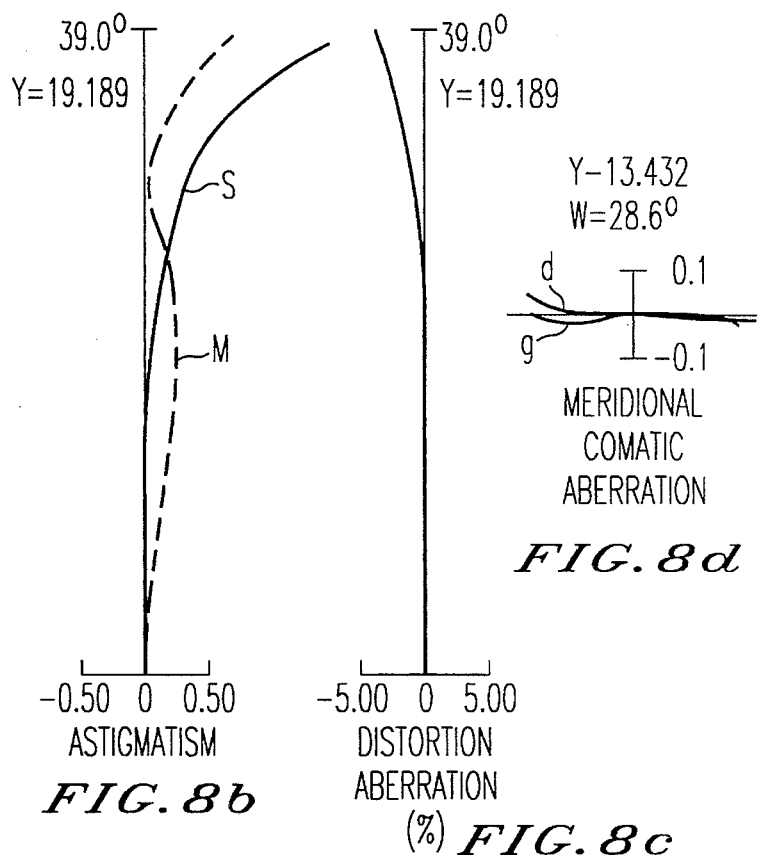
FIG. 8a SPHERICAL ABERRATION (SA) SINE CONDITION (SC)
FIG. 8b ASTIGMATISM
FIG. 8c DISTORTION ABERRATION (%)
FIG. 8d MERIDIONAL COMATIC ABERRATION
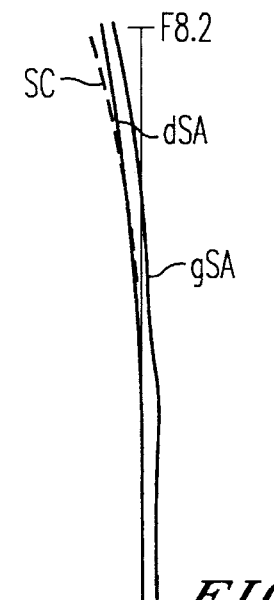
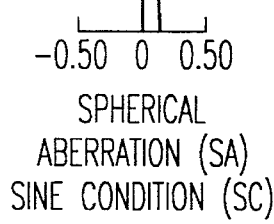
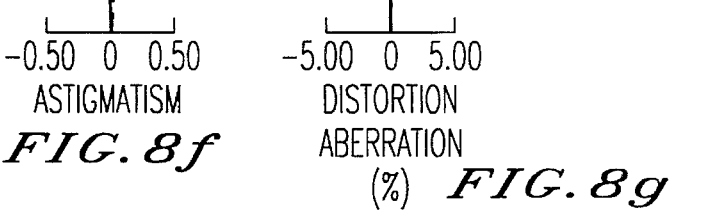
FIG. 8e SPHERICAL ABERRATION (SA) SINE CONDITION (SC)
FIG. 8f ASTIGMATISM
FIG. 8g DISTORTION ABERRATION (%)
FIG. 8h MERIDIONAL COMATIC ABERRATION

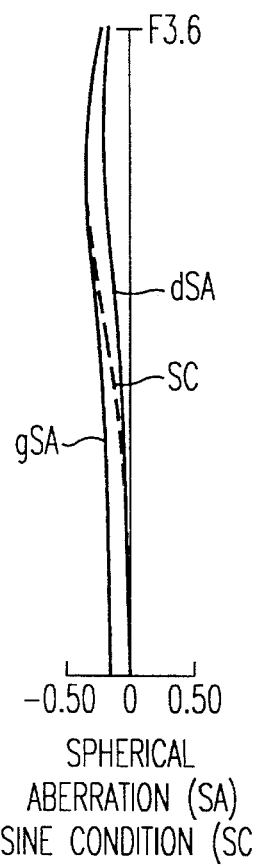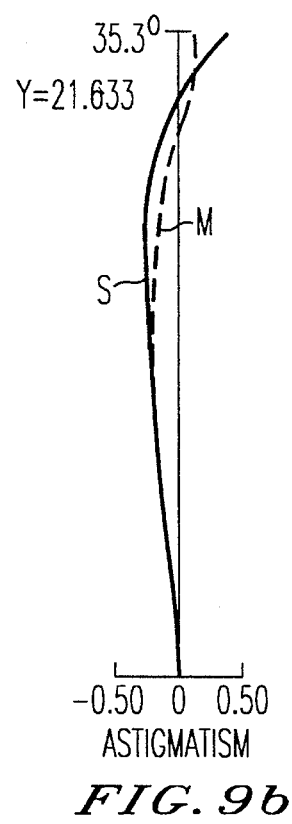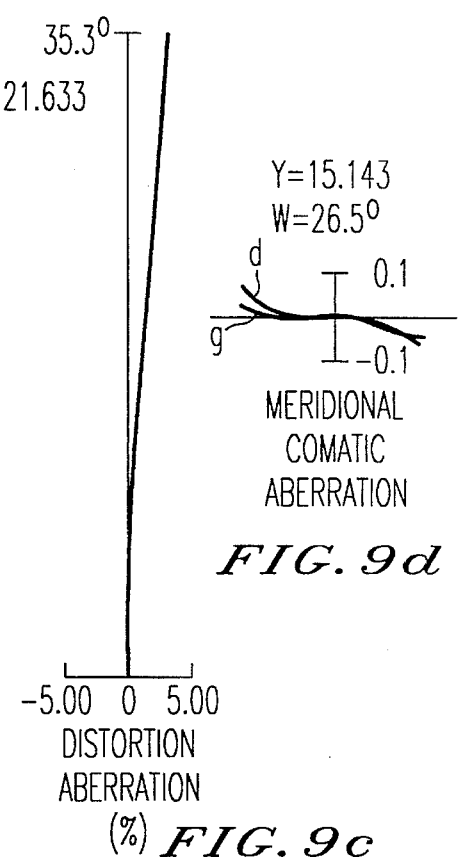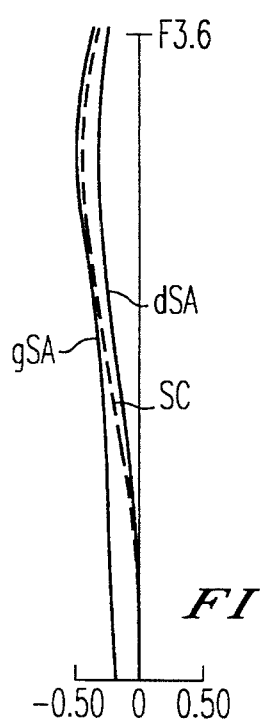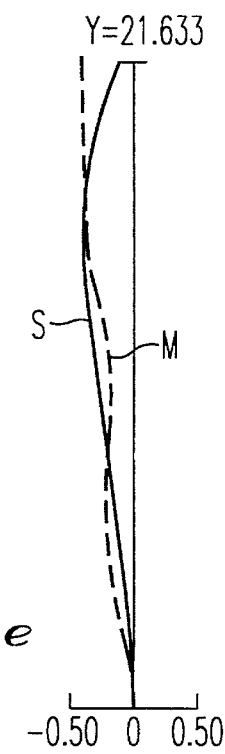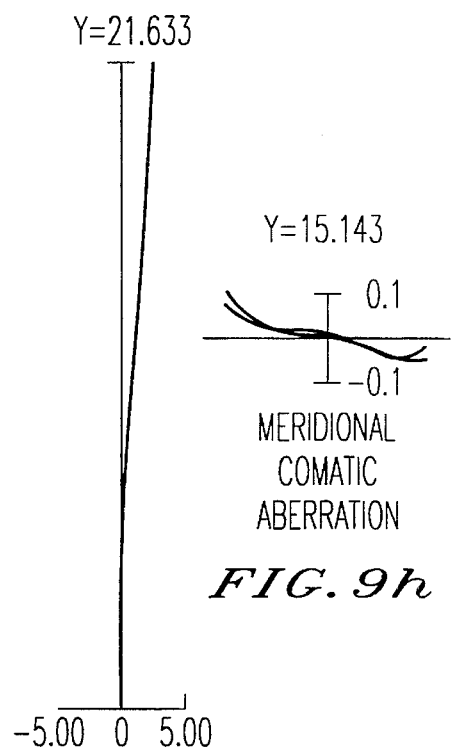
*FIG. 9a* — SPHERICAL ABERRATION (SA) SINE CONDITION (SC)
*FIG. 9b* — ASTIGMATISM
*FIG. 9c* — DISTORTION ABERRATION (%)
*FIG. 9d* — MERIDIONAL COMATIC ABERRATION
*FIG. 9e* — SPHERICAL ABERRATION (SA) SINE CONDITION (SC)
*FIG. 9f* — ASTIGMATISM
*FIG. 9g* — DISTORTION ABERRATION (%)
*FIG. 9h* — MERIDIONAL COMATIC ABERRATION

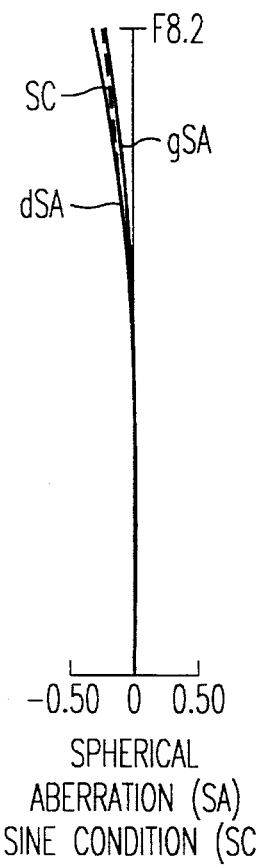
FIG. 10a
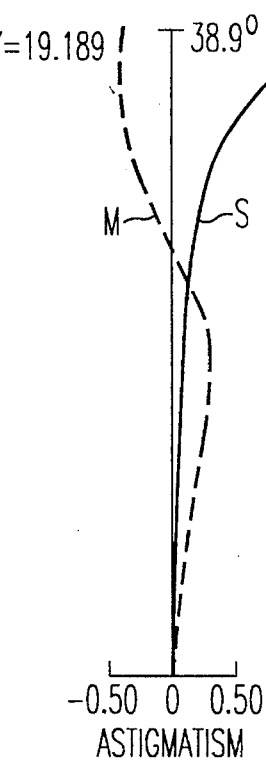
FIG. 10b
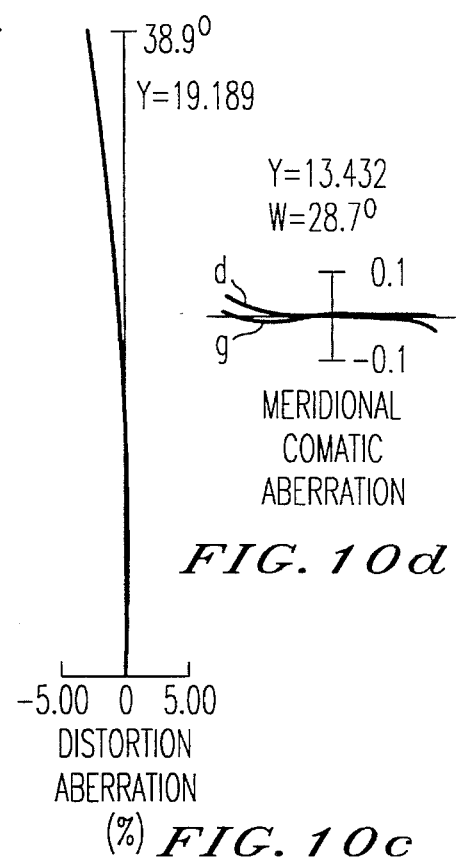
FIG. 10c
FIG. 10d
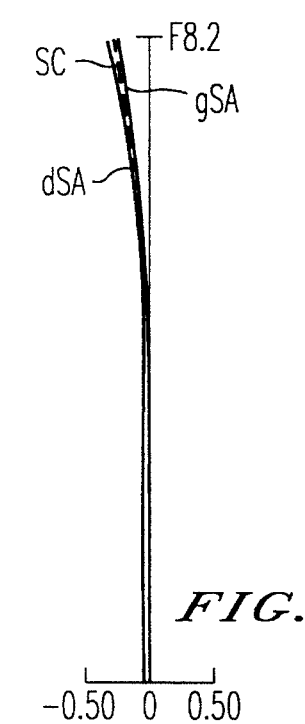
FIG. 10e
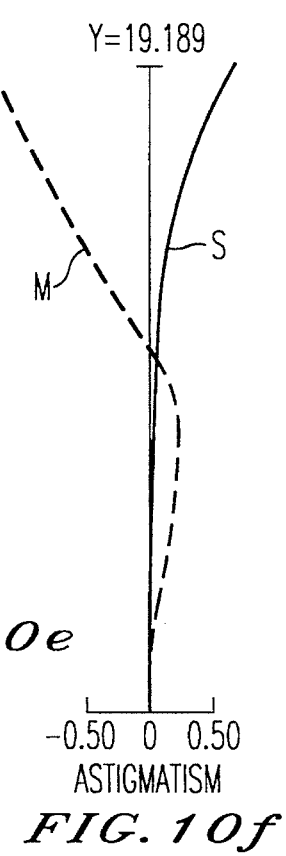
FIG. 10f
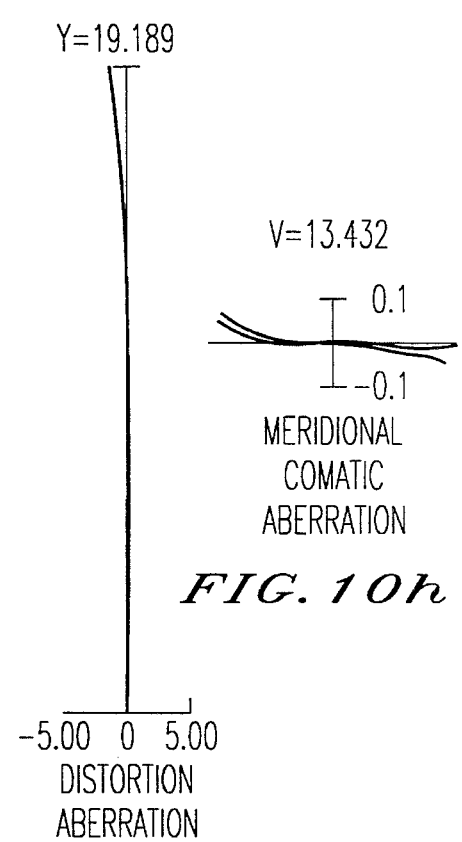
FIG. 10g
FIG. 10h

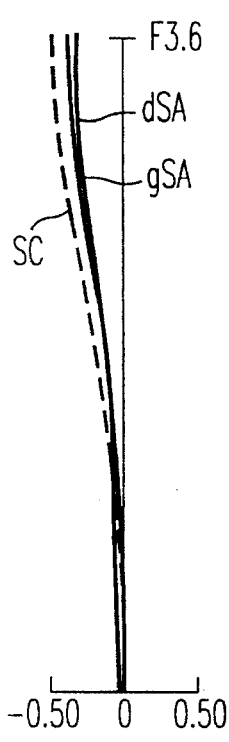
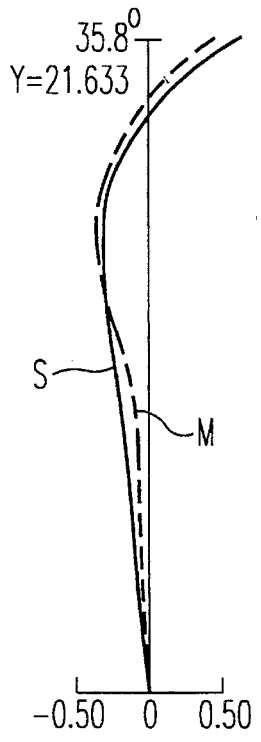
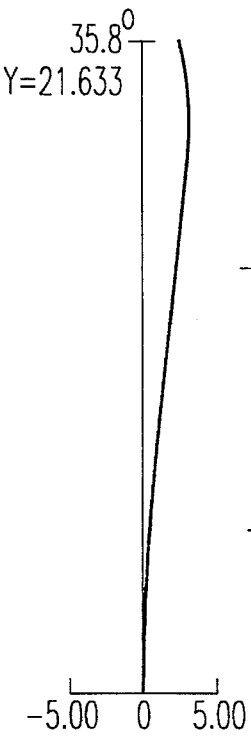
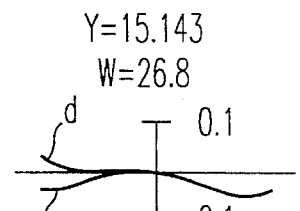
FIG. 11a — SPHERICAL ABERRATION (SA) SINE CONDITION (SC)
FIG. 11b — ASTIGMATISM
FIG. 11c — DISTORTION ABERRATION (%)
FIG. 11d — MERIODONAL COMATIC ABERRATION
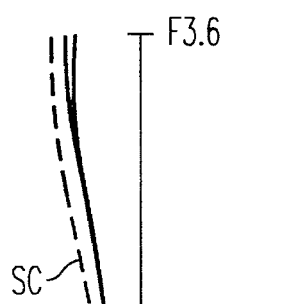
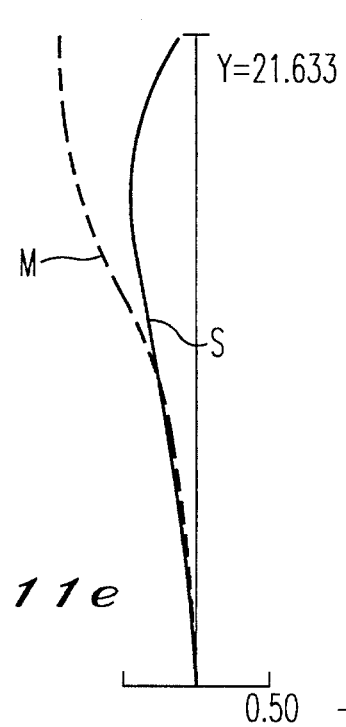
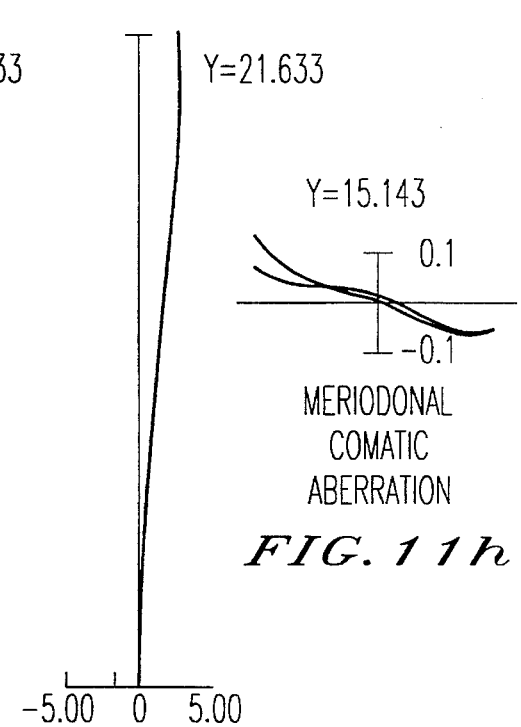
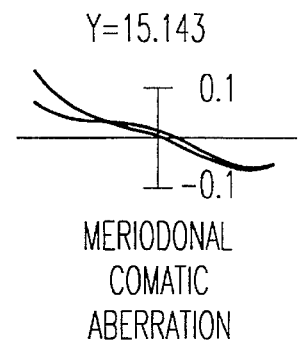
FIG. 11e — SPHERICAL ABERRATION (SA) SINE CONDITION (SC)
FIG. 11f — ASTIGMATISM
FIG. 11g — DISTORTION ABERRATION (%)
FIG. 11h — MERIODONAL COMATIC ABERRATION

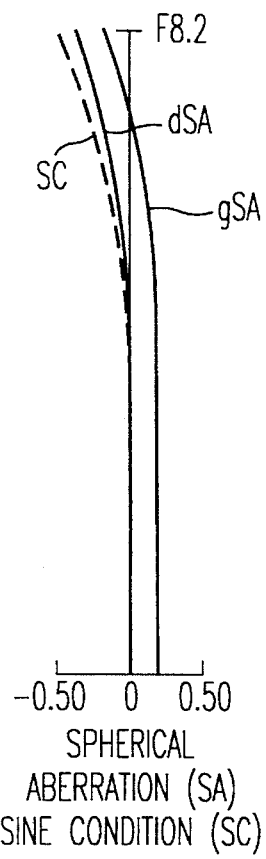
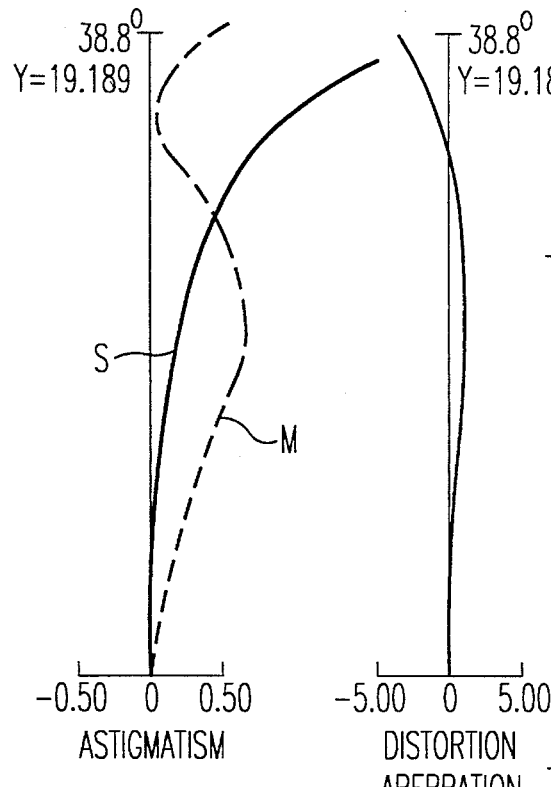
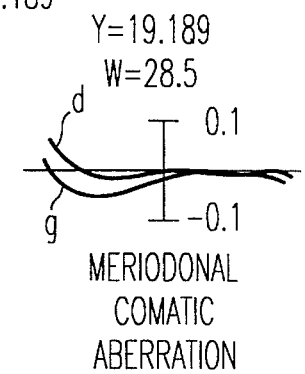
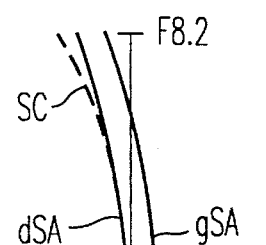
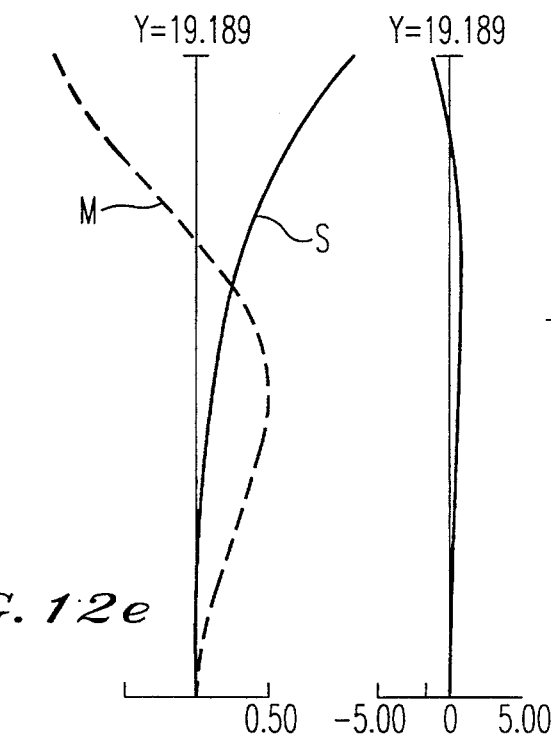
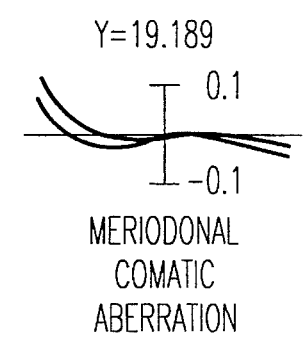
*FIG. 12a* — SPHERICAL ABERRATION (SA) SINE CONDITION (SC)
*FIG. 12b* — ASTIGMATISM
*FIG. 12c* — DISTORTION ABERRATION (%)
*FIG. 12d* — MERIODONAL COMATIC ABERRATION
*FIG. 12e* — SPHERICAL ABERRATION (SA) SINE CONDITION (SC)
*FIG. 12f* — ASTIGMATISM
*FIG. 12g* — DISTORTION ABERRATION (%)
*FIG. 12h* — MERIODONAL COMATIC ABERRATION

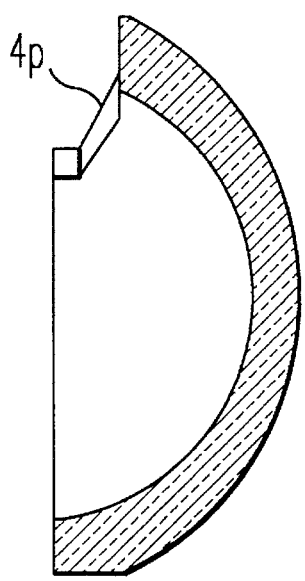
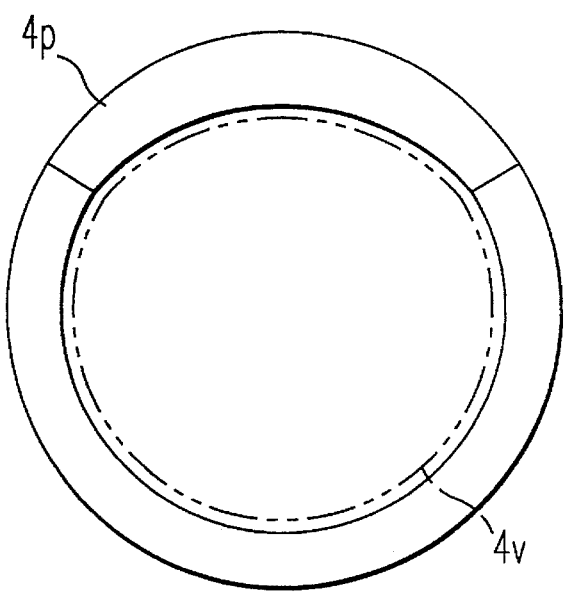
FIG. 13a
FIG. 13b 5,513,042

LENS SYSTEM WITH MASTER LENS SYSTEM AND CONVERSION LENS

BACKGROUND OF THE INVENTION

1. Field of the Invention

The present invention relates to a lens system with a master lens system and a conversion lens system. More particularly, the present invention is directed to a lens system for varying a focal length of the lens system by inserting and removing a conversion lens system into and out of an optical path of the master lens system. The lens system in the present invention may be utilized as a photographing lens in a lens shutter camera and a video camera.

2. Description of the Background Art

Recently, there has been a strong demand for a popular camera designed as an integral unit of a camera body and a photographing lens system which can photograph at a wide-position and tele-position, etc., by varying a focal length of the photographing lens system.

In order to satisfy this demand, it has been proposed to design the photographing lens system for the popular camera as a zoom lens system capable of varying a focal length thereof or as a lens system capable of varying a focal length by inserting and removing a conversion lens into and out of an optical path of the photographing lens system.

As the lens system of the latter type, one example is disclosed in U.S. Pat. No. 4,708,442 which discloses a varifocal lens system. The varifocal lens system includes a master lens system, and an auxiliary lens group. The master lens system includes a front lens group having a positive refractive power and a rear lens group having a negative refractive power. The auxiliary lens group is arranged in such a manner that the auxiliary lens group can be freely inserted and removed between the front lens group and the rear lens group so as to vary a focal length of the overall varifocal lens system.

However, in the above-mentioned conventional varifocal lens system, a field angle of the master lens system is only 20 degrees. This deficiency can not minimize a bulk and size of the camera.

Further, when the auxiliary lens group is inserted between the front lens group and the rear lens group of the master lens system, the front lens group of the master lens system must be shifted to an image side.

Thus the varifocal lens system requires an undesirably complicated and large mechanism for varying a focal length.

SUMMARY OF THE INVENTION

Accordingly, one object of the present invention is to provide a novel lens system with a master lens system and a conversion lens system which can solve the aforementioned drawbacks in the conventional systems.

Another object of the present invention is to provide a novel lens system with a master lens system and a conversion lens system in which a field angle of the master lens system is more than 35 degrees.

Another object of the present invention to provide a novel lens system with a master lens system and a conversion lens system in which the conversion lens system is releasably attached between the master lens system with a simple mechanism for varying a focal length of the lens system.

Another object of the present invention is to provide a novel lens system with a master lens system and a conversion lens system which can minimize a number of constituent lens elements so as to make a camera itself compact.

In order to achieve the above-mentioned objects, according to the present invention, there is provided a lens system with a master lens system and a conversion lens system in the following manner.

The master lens system has a first lens, a second lens, a third lens, and a fourth lens, which are sequentially arranged from an object side of the lens system to an image side thereof. Further, a first diaphragm is arranged between the third lens and the fourth lens. The first lens is a positive meniscus lens having a convex surface toward the object side. The second lens is a negative lens. The third lens is a positive lens. The fourth lens is a negative meniscus lens having a concave surface toward the object side.

The conversion lens system is arranged in such a manner that the conversion lens system can be freely inserted and removed between the third lens and the fourth lens. When the conversion lens system is inserted and removed between the third lens and the fourth lens, a relative position of the respective first, second, third and fourth lenses is fixed, and a focal length of the lens system becomes shorter than a focal length of the master lens system.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings in which:

FIG. 5c is an aberrational diagram of the master lens system showing a distortion aberration at the first photographing distance (infinite) in accordance with the first embodiment of the present invention;

FIG. 5g is an aberrational diagram of the master lens system showing the distortion aberration at the second photographing distance (0.35 m) in accordance with the first embodiment of the present invention;

FIG. 6c is an aberrational diagram of the master lens system with the conversion lens system showing the distortion aberration at the first photographing distance (infinite) in accordance with the first embodiment of the present invention;

FIG. 6g is an aberrational diagram of the master lens system with the conversion lens system showing the distortion aberration at the second photographing distance (0.35 m) in accordance with the first embodiment of the present invention;

FIG. 7a is an aberrational diagram of the master lens system showing the spherical aberration and the sine condition at the first photographing distance (infinite) in accordance with the second embodiment of the present invention;

FIG. 7b is an aberrational diagram of the master lens system showing the astigmatism at the first photographing distance (infinite) in accordance with the second embodiment of the present invention;

FIG. 7c is an aberrational diagram of the master lens system showing the distortion aberration at the first photographing distance (infinite) in accordance with the second embodiment of the present invention;

FIG. 7d is an aberrational diagram of the master lens system showing the meridional comatic aberration at the first photographing distance (infinite) in accordance with the second embodiment of the present invention;

FIG. 7e is an aberrational diagram of the master lens system showing the spherical aberration and the sine condition at the second photographing distance (0.35 m) in accordance with the second embodiment of the present invention;

FIG. 7f is an aberrational diagram of the master lens system showing the astigmatism at the second photographing distance (0.35 m) in accordance with the second embodiment of the present invention;

FIG. 7g is an aberrational diagram of the master lens system showing the distortion aberration at the second photographing distance (0.35 m) in accordance with the second embodiment of the present invention;

FIG. 7h is an aberrational diagram of the master lens system showing the meridional comatic aberration at the second photographing distance (0.35 m) in accordance with the second embodiment of the present invention;

FIG. 8a is an aberrational diagram of the master lens system with the conversion lens system showing the spherical aberration and the sine condition at the first photographing distance (infinite) in accordance with the second embodiment of the present invention;

FIG. 8b is an aberrational diagram of the master lens system with the conversion lens system showing the astigmatism at the first photographing distance (infinite) in accordance with the second embodiment of the present invention;

FIG. 8c is an aberrational diagram of the master lens system with the conversion lens system showing the distortion aberration at the first photographing distance (infinite) in accordance with the second embodiment of the present invention;

FIG. 8d is an aberrational diagram of the master lens system with the conversion lens system showing the meridional comatic aberration at the first photographing distance (infinite) in accordance with the second embodiment of the present invention;

FIG. 8e is an aberrational diagram of the master lens system with the conversion lens system showing the spherical aberration and the sine condition at the second photographing distance (0.35 m) in accordance with the second embodiment of the present invention;

FIG. 8f is an aberrational diagram of the master lens system with the conversion lens system showing the astigmatism at the second photographing distance (0.35 m) in accordance with the second embodiment of the present invention;

FIG. 8g is an aberrational diagram of the master lens system with the conversion lens system showing the distortion aberration at the second photographing distance (0.35 m) in accordance with the second embodiment of the present invention;

FIG. 8h is an aberrational diagram of the master lens system with the conversion lens system showing the meridional comatic aberration at the second photographing distance (0.35 m) in accordance with the second embodiment of the present invention;

FIG. 9a is an aberrational diagram of the master lens system showing the spherical aberration and the sine condition at the first photographing distance (infinite) in accordance with the third embodiment of the present invention;

FIG. 9b is an aberrational diagram of the master lens system showing the astigmatism at the first photographing distance (infinite) in accordance with the third embodiment of the present invention;

FIG. 9c is an aberrational diagram of the master lens system showing the distortion aberration at the first photographing distance (infinite) in accordance with the third embodiment of the present invention;

FIG. 9d is an aberrational diagram of the master lens system showing the meridional comatic aberration at the first photographing distance (infinite) in accordance with the third embodiment of the present invention;

FIG. 9e is an aberrational diagram of the master lens system showing the spherical aberration and the sine condition at the second photographing distance (0.35 m) in accordance with the third embodiment of the present invention;

FIG. 9f is an aberrational diagram of the master lens system showing the astigmatism at the second photographing distance (0.35 m) in accordance with the third embodiment of the present invention;

FIG. 9g is an aberrational diagram of the master lens system showing the distortion aberration at the second photographing distance (0.35 m) in accordance with the third embodiment of the present invention;

FIG. 9h is an aberrational diagram of the master lens system showing the meridional comatic aberration at the second photographing distance (0.35 m) in accordance with the third embodiment of the present invention;

FIG. 10a is an aberrational diagram of the master lens system with the conversion lens system showing the spherical aberration and the sine condition at the first photographing distance (infinite) in accordance with the third embodiment of the present invention;

FIG. 10b is an aberrational diagram of the master lens system with the conversion lens system showing the astigmatism at the first photographing distance (infinite) in accordance with the third embodiment of the present invention;

FIG. 10c is an aberrational diagram of the master lens system with the conversion lens system showing the distortion aberration at the first photographing distance (infinite) in accordance with the third embodiment of the present invention;

FIG. 10d is an aberrational diagram of the master lens system with the conversion lens system showing the meridional comatic aberration at the first photographing distance (infinite) in accordance with the third embodiment of the present invention;

FIG. 10e is an aberrational diagram of the master lens system with the conversion lens system showing the spherical aberration and the sine condition at the second photographing distance (0.35 m) in accordance with the third embodiment of the present invention;

FIG. 10f is an aberrational diagram of the master lens system with the conversion lens system showing the astigmatism at the second photographing distance (0.35 m) in accordance with the third embodiment of the present invention;

FIG. 10g is an aberrational diagram of the master lens system with the conversion lens system showing the distortion aberration at the second photographing distance (0.35 m) in accordance with the third embodiment of the present invention;

FIG. 10h is an aberrational diagram of the master lens system with the conversion lens system showing the meridional comatic aberration at the second photographing distance (0.35 m) in accordance with the third embodiment of the present invention;

FIG. 11a is an aberrational diagram of the master lens system showing the spherical aberration and the sine condition at the first photographing distance (infinite) in accordance with the third embodiment of the present invention;

FIG. 11b is an aberrational diagram of the master lens system showing the astigmatism at the first photographing distance (infinite) in accordance with the fourth embodiment of the present invention;

FIG. 11c is an aberrational diagram of the master lens system showing the distortion aberration at the first photographing distance (infinite) in accordance with the fourth embodiment of the present invention;

FIG. 11d is an aberrational diagram of the master lens system showing the meridional comatic aberration at the first photographing distance (infinite) in accordance with the fourth embodiment of the present invention;

FIG. 11e is an aberrational diagram of the master lens system showing the spherical aberration and the sine condition at the second photographing distance (0.35 m) in accordance with the fourth embodiment of the present invention;

FIG. 11f is an aberrational diagram of the master lens system showing the astigmatism at the second photographing distance (0.35 m) in accordance with the fourth embodiment of the present invention;

FIG. 11g is an aberrational diagram of the master lens system showing the distortion aberration at the second photographing distance (0.35 m) in accordance with the fourth embodiment of the present invention;

FIG. 11h is an aberrational diagram of the master lens system showing the meridional comatic aberration at the second photographing distance (0.35 m) in accordance with the fourth embodiment of the present invention;

FIG. 12a is an aberrational diagram of the master lens system with the conversion lens system showing the spherical aberration and the sine condition at the first photographing distance (infinite) in accordance with the fourth embodiment of the present invention;

FIG. 12b is an aberrational diagram of the master lens system with the conversion lens system showing the astigmatism at the first photographing distance (infinite) in accordance with the fourth embodiment of the present invention;

FIG. 12c is an aberrational diagram of the master lens system with the conversion lens system showing the distortion aberration at the first photographing distance (infinite) in accordance with the fourth embodiment of the present invention;

FIG. 12d is an aberrational diagram of the master lens system with the conversion lens system showing the meridional comatic aberration at the first photographing distance (infinite) in accordance with the fourth embodiment of the present invention;

FIG. 12e is an aberrational diagram of the master lens system with the conversion lens system showing the spherical aberration and the sine condition at the second photographing distance (0.35 m) in accordance with the fourth embodiment of the present invention;

FIG. 12f is an aberrational diagram of the master lens system with the conversion lens system showing the astigmatism at the second photographing distance (0.35 m) in accordance with the fourth embodiment of the present invention;

FIG. 12g is an aberrational diagram of the master lens system with the conversion lens system showing the distortion aberration at the second photographing distance (0.35 m) in accordance with the fourth embodiment of the present invention;

FIG. 12h is an aberrational diagram of the master lens system with the conversion lens system showing the meridional comatic aberration at the second photographing distance (0.35 m) in accordance with the fourth embodiment of the present invention;

FIG. 13a is a view of a fourth lens of the master lens system of the present invention;

FIG. 13b is a section along line x—x of FIG. 13a;

DESCRIPTION OF THE PREFERRED EMBODIMENTS

Preferred embodiments of a lens system with a master lens system and a conversion lens system in accordance with the present invention is explained herein with reference to the accompanying drawings.

Figure 1A:
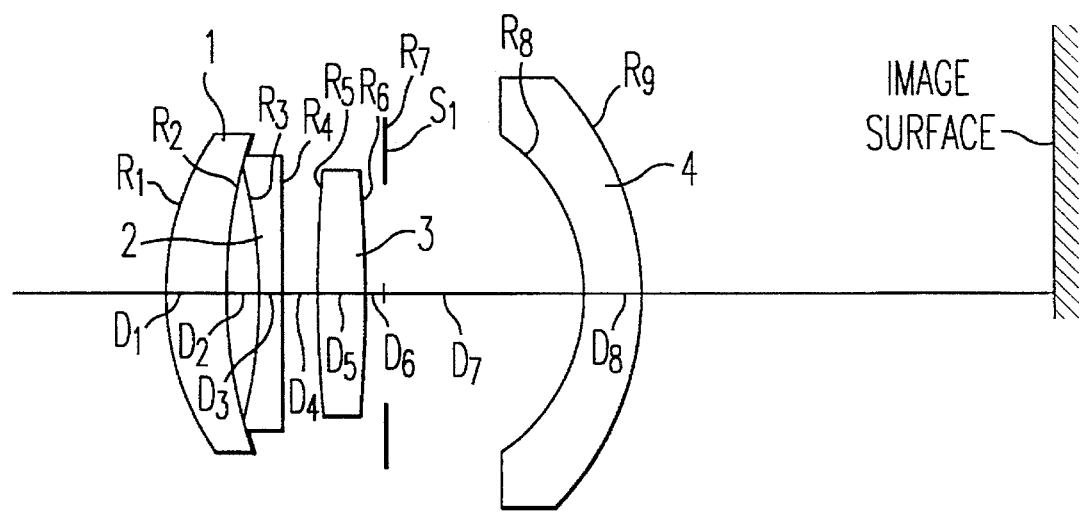
FIG. 1a shows a sectional view illustrating a composition of a master lens system in accordance with a first embodiment of the present invention.
Figure 1B:
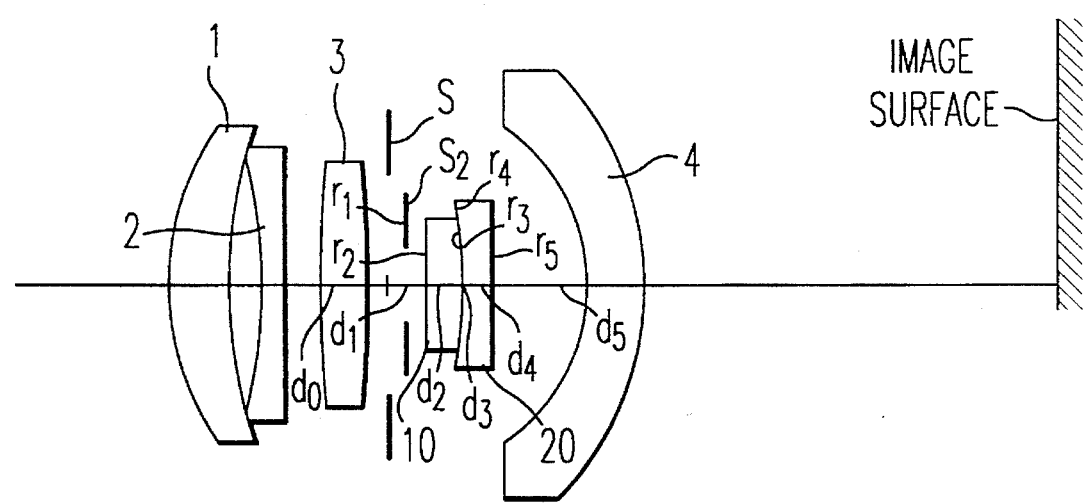
FIG. 1b shows a sectional view illustrating a composition of the master lens system with the conversion lens system inserted therein in accordance with the first embodiment of the present invention.

Referring to FIG. 1a and FIG. 1b, the lens system of the present invention includes a master lens system, a conversion lens system, a first diaphragm S1, and a second diaphragm s2.

The master lens system has a first lens 1, a second lens 2, a third lens 3, and a fourth lens 4, which are sequentially arranged from an object side of the lens system to an image surface side thereof. The first lens 1 is a positive meniscus lens having a convex surface toward the object side. The second lens 2 is a negative lens. The third lens 3 is a positive lens. The fourth lens 4 is a negative meniscus lens having a concave surface toward the object side.

The conversion lens system, as shown in FIG. 1b, includes a fifth lens 10 and a sixth lens 20, which are sequentially arranged from an object side of the lens system to the image surface side thereof. The fifth lens 10 is a positive lens. The sixth lens 20 is a negative lens. The conversion lens system is arranged in such a manner that the conversion lens system can be freely inserted and removed between the third lens 3 and the fourth lens 4 of the master lens system.

The first diaphragm S1 is arranged between the third lens 3 and the fourth lens 4 of the master lens system. The second diaphragm s2 is arranged in front of the fifth lens 10 of the conversion lens system toward the object side.

When the conversion lens system is inserted and removed between the third lens 3 and the fourth lens 4, relative positions of the respective first 1, second 2, third 3 and fourth 4 lenses are fixed. When the conversion lens system is inserted between the third lens 3 and the fourth lens 4, a focal length of the lens system (master lens system+ conversion lens system) becomes shorter than a focal length of the master lens system itself.

Referring to FIG. 1, as the master lens system has four lenses 1–4(positive, negative, positive, negative), and the first diaphragm S1 is arranged between the third lens 3 and the fourth lens 4 of the master lens system, a total length of the master lens system can become short. The total length of the master lens system is a distance from a front surface of the first lens 1 to the image surface.

As the master lens system has a lens structure such that the first lens 1 is a positive meniscus lens having a convex surface toward the object side, the second lens 2 is a negative lens, the third lens 3 is a positive lens, and the fourth lens 4 is a negative meniscus lens having a concave surface toward the object side, a field angle of the master lens system can be more than 35 degrees.

As the relative position of the respective first 1, second 2, third 3 and fourth 4 lenses are fixed at the time of inserting the conversion lens system into the master lens system, it is not necessary to shift the lens arrangement of the master lens system along the optical axis.

In another words, as shown in the FIG. 1a, a distance D2, a distance D4, a distance D6 and a distance D7 are constant. The distance D2 is a distance between the first lens 1 and the second lens 2. The distance D4 is a distance between the second lens 2 and the third lens 3. The distance D6 is a distance between the third lens 3 and the first diaphragm S1. The distance D7 is a distance between the first diaphragm S1 and the fourth lens 4.

As the distance D6 and the distance D7 are constant, the conversion lens system can be inserted between the third lens 3 and the fourth lens 4 in a direction perpendicular to an optical axis of the master lens system.

As a focal length of the master lens system is short, and the field angle of the master lens system is wide, a shifting amount of the master lens system for focusing can be small. At the time of focusing, the distances D2, D4, D6, D7 remain constant. The master lens system itself shifts a small distance in a direction on the optical axis for the purpose of focusing with the distances D2, D4, D6, D7 remaining constant. Further, especially at the time of focusing in a short distance, the total length of the master lens system can be short.

Further, the conversion lens system may be inserted between the first diaphragm S1 and the fourth lens 4 for varying the focal length of the overall lens system. As the conversion lens system is inserted and removed between the first diaphragm S1 and the fourth lens 4, the lens structure of the first lens 1 in the master lens system can be compact.

Referring to FIGS. 1a, 2a, 3a, 4a, which show the master lens systems according to respective first to fourth embodiments of the present invention, a surface R8 on the object side of the fourth lens 4 of the master lens system is aspherical. Further, the aspherical surface R8 of the fourth lens 4 may be shaped in the following manner.

The larger a distance from the optical axis in the direction perpendicular to the optical axis becomes, the larger a curvature ratio of the aspherical surface R8 becomes. A shifting amount $\delta_4$, which is a deviation from an ideal spherical surface in a peripheral portion of the fourth lens 4 may then satisfy the following relationships:

$$0.05 < \delta_4 < 0.4.$$

As the aspherical surface R8 of the fourth lens 4 is shaped in the above-mentioned manner, an aberration which is generated in the surface R8 of the fourth lens 4 can be preferably corrected.

Further, the aspherical surface R8 of the fourth lens 4 may be shaped in the following manner. The larger a distance from the optical axis in the direction perpendicular to the optical axis becomes, the smaller a curvature ratio of the aspherical surface R8 becomes. A shifting amount $\delta_4'$, which is a deviation from an ideal spherical surface in a peripheral portion of the fourth lens 4, may then satisfy the following relationships:

$$0.05 < \delta_4' < 0.3$$

As the aspherical surface R8 of the fourth lens 4 is shaped in above-mentioned manner, the distance D6 and D7 can be large and much space can be available for inserting the conversion lens system.

When the conversion lens system is inserted between the third lens 3 and the fourth lens 4 for varying the focal length, a maximum diaphragm diameter of the first diaphragm S1 is reduced. As the maximum diaphragm diameter of the first diaphragm S1 is reduced, a diameter of the conversion lens system can be reduced.

When the conversion lens system has a fixed diaphragm on the object side, a diaphragm diameter of the fixed diaphragm is smaller than the maximum diaphragm diameter of the diaphragm S1 of the master lens system. As the diaphragm diameter of the diaphragm S1 is reduced with inserting the conversion lens system, a mechanism for the diaphragm can become simple.

When the conversion lens system is removed from the master lens system, the entire master lens system shifts in the direction of the optical axis for the purpose of focusing. When the conversion lens system is inserted into the master lens system, the entire lens system with the master lens system and the conversion lens system shifts in the direction of the optical axis for the purpose of focusing.

Further, a mechanism for focusing the master lens system and a mechanism for focusing the lens system may be the same shifting mechanism, and thus the mechanism for focusing can be simple. Also, as the master lens system and the conversion lens system will be shifted in unison in the direction of the optical axis, a deterioration of a performance of the lens system is prevented at the time of focusing in a short distance.

As a further feature of the present invention, and as is shown in FIGS. 13a and 13b, a portion 4p outside of a valid focusing range 4v in the fourth lens 4 of the master lens system may be cut out from the fourth lens 4. The portion 4p is provided as a space for inserting and removing the conversion lens system. As the conversion lens system is inserted and removed only in the direction perpendicular to the optical axis, a mechanism for inserting and removing the conversion lens system can be simplified.

The conversion lens system includes the fifth lens 10 and the sixth lens 20, which are sequentially arranged from the object side of the lens system to the image surface side thereof. The fifth lens 10 is a positive lens and the sixth lens 20 is a negative lens. As the conversion lens system is provided in the above-mentioned manner, an aberration of the conversion lens system is preferably corrected and a thickness of the conversion lens system in the direction of the optical axis is reduced at the same time.

The surface r5 of sixth lens 20 on the closest image side of the conversion lens system may be aspherical. The aspherical surface r5 of the sixth lens 20 in the conversion lens system may be shaped in such a following manner.

Since the surface r5 is aspherical, a middle point along the surface r5 will deviate from the optical axis.

The larger a distance from the optical axis to a middle point of the surface r5 of the sixth lens 20 becomes, as measured in the direction perpendicular to the optical axis, a curvature ratio of the aspherical surface r5 becomes larger. The surface r5 of the aspherical surface r5 intersects an ideal spherical surface of the sixth lens 20. At that point, the larger a distance from the middle point to a peripheral of the surface r5 of the sixth lens 20 in the direction perpendicular to the optical axis becomes, the smaller a curvature ratio of the aspherical surface r5 becomes. A shifting amount $\delta_c$, which is a deviation from the ideal spherical surface in a peripheral portion of the sixth lens 20, may then satisfy the following relationships:

$$0.001 < \delta_c < 0.005.$$

As the aspherical surface r5 of the sixth lens 20 is shaped in above-mentioned manner, an aberration which is generated in the surface r5 of the sixth lens 20 can be further preferably corrected.

Examples of numeric values of parameters of the above constructional elements of the lens systems of the present invention with the master lens systems and the conversion lens systems shown in each of FIGS. 1a, 1b, 2a, 2b, 3a, 3b, 4a and 4b are concretely set forth below.

In FIGS. 1a, 2a, 3a, 4a, the master lens system and the first diaphragm S1 are arranged in a state in which no conversion lens system is positioned with the master lens system.

With respect to the master lens system in this arrangement, Ri (i=1 to 9) designates a radius of curvature of an i-th lens surface including a first diaphragm face, which is counted from the object side of the master lens system; Di (i=1 to 8) designates a distance between the i-th lens surface and an (i+1)-th lens surface on the optical axis of the master lens system, which is counted from the object side of the master lens system; Nj (j=1 to 4) designates a refractive index of a material of a j-th lens, which is counted from the object side of the master lens system; and vj (j=1 to 4) designates an Abbe's number of this j-th lens, which is counted from the object side of the master lens system.

In FIGS. 1b, 2b, 3b, 4b, the master lens system and the first diaphragm S1 are arranged in a state in which the conversion lens system and the second diaphragm s2 are positioned with the master lens system.

With respect to the conversion lens system in this arrangement, ri (i=1 to 5) designates a radius of curvature of an i-th lens surface including a second diaphragm face, which is counted from the object side of the master lens system (a side of the first diaphragm S1 of the master lens system); di (i=1 to 4) designates a distance between the i-th lens surface and an (i+1)-th lens surface on the optical axis of the master lens system, which is counted from the object side of the master lens system; nl (l=1 to 2) designates a refractive index of a material of a l-th lens, which is counted from the object side of the master lens system; vl (l=1 to 2) designates an Abbe's number of this l-th lens, which is counted from the object side of the master lens system; $d_1$ designates a distance from the first diaphragm S1 of the master lens system to the second diaphragm S1 of the conversion lens system; and $d_5$ designates a distance from a final surface of the conversion lens system to the surface toward the object side of the fourth lens 4 of the master lens system on the optical axis.

Further, reference numeral F1 designates a focal length of the master lens system, and reference numeral F2 designates a focal length of the lens system with the master lens system and the conversion lens system. Reference numeral F1/No designates a brightness of the master lens system, and reference numeral F2/No designates a brightness of the lens system with the master lens system and the conversion lens system. Reference numeral $\omega_1$ designates a half field angle of the master lens system, and reference numeral $\omega_2$ designates a half field angle of the lens system with the master lens system and the conversion lens system. The master lens system and the conversion lens system may also have the aspherical surfaces.

In the following description, a X-coordinate is set to be in conformity with the optical axis of the lens system. A H-coordinate is set to be perpendicular to the optical axis of the lens system.

Reference numeral c designates the curvature ratio on the optical axis (c=1/(a radius of curvature of an aspherical surface on the optical axis)). Reference numeral K designates a conical constant. Reference numeral A, B, C, and D designate aspherical coefficients of higher orders. In this case, as is well known, the aspherical surface is provided by a curved surface obtained by rotating a curve represented by the following formula around the optical axis of the lens system.

$$X = CH^2/\{1+\sqrt{[1-(1+k)c^2H^2]}\} + A \cdot H^4 + B \cdot H^6 + C \cdot H^8 + D \cdot H^{10}$$

A shape of the aspherical surface is specified by providing the radius of curvature on the optical axis of the lens system, the conical constant and the aspherical coefficients of higher orders.

With respect to the aspherical coefficients, E and a number subsequent to this E show a power. For example, 'E-9' shows $1/10^9$ and this value $1/10^9$ is multiplied by a numeric value before this value.

First Embodiment

Numeric values of the above-mentioned parameters of the lens system shown in FIG. 1a, 1b are set out in a following Tables 1a and 1b. As noted above, FIG. 1a shows a sectional view illustrating the composition of a master lens system and FIG. 1b shows a sectional view illustrating the composition of the master lens system with the conversion lens system inserted therein according to a first embodiment of the present invention.

TABLE 1a

| Master Lens System $F = 29.1$, F/No = 36, $\omega = 35.9$ | | | | | |
|---|---|---|---|---|---|
| i | $R_i$ | $D_i$ | j | $N_j$ | $v_j$ |
| 1 | 9.033 | 1.976 | 1 | 1.73400 | 51.05 |
| 2 | 16.448 | 0.966 | | | |
| 3 | −21.610 | 0.800 | 2 | 1.84666 | 23.78 |
| 4 | 90.550 | 1.272 | | | |
| 5 | 28.794 | 1.690 | 3 | 1.80450 | 39.64 |
| 6 | −23.782 | 0.500 | | | |
| 7 | ∞ (S1) | 6.643 | | | |
| 8 | −6.208 | 2.000 | 4 | 1.49154 | 57.82 |

TABLE 1a-continued

| Master Lens System $F = 29.1$, F/No = 36, $\omega = 35.9$ | | | | | |
|---|---|---|---|---|---|
| i | $R_i$ | $D_i$ | j | $N_j$ | $v_j$ |
| 9 | −10.925 | | | | | aspherical surface, 8th surface (R8)

$K = 0.28660$, $A = -3.741E-4$, $B = 1.574E-5$,
$C = -3.192E-7$, $D = -9.250E-9$

9th surface (R9)

$K = -0.11690$, $A = -2.243E-4$, $B = 3.084E-6$,
$C = -7.350E-8$, $D = -1.943E-10$, $\delta_4 = -0.3381$
protrusion amount for photographing distance
photographing distance = 0.35 m,
protrusion amount = 2.986

TABLE 1b

| Conversion Lens System $F = 24.7$ F/No = 8.2 $\omega = 38.9$ | | | | | |
|---|---|---|---|---|---|
| m | $r_m$ | $d_m$ | l | $n_l$ | $v_l$ |
| 0 | | 0.500 | | | |
| 1 | ∞ (S2) | 0.727 | | | |
| 2 | −29.014 | 1.225 | 1 | 1.88300 | 40.80 |
| 3 | −8.468 | 0.100 | | | |
| 4 | −9.466 | 0.800 | 2 | 1.58500 | 29.30 |
| 5 | 251.752 | 3.291 | | | | aspherical surface, 5th surface (r5)

$K = 8393.000$, $A = 1.893E-4$, $B = -2.092E-4$,
$C = 4.119E-5$, $D = -2.961E-6$, $\delta_c = -0.0039$
protrusion amount for photographing distance
photographing distance = 0.35 m,
protrusion amount = 2.071

Figure 5A:
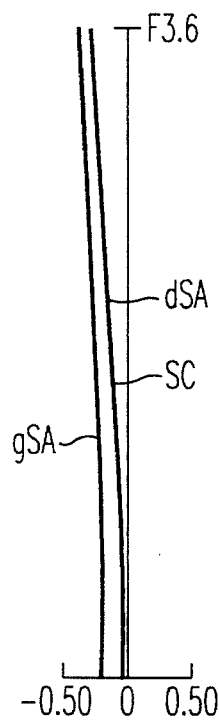
FIG. 5a is an aberrational diagram of the master lens system showing a spherical aberration and a sine condition at a first photographing distance (infinite) in accordance with the first embodiment of the present invention.
Figure 5B:
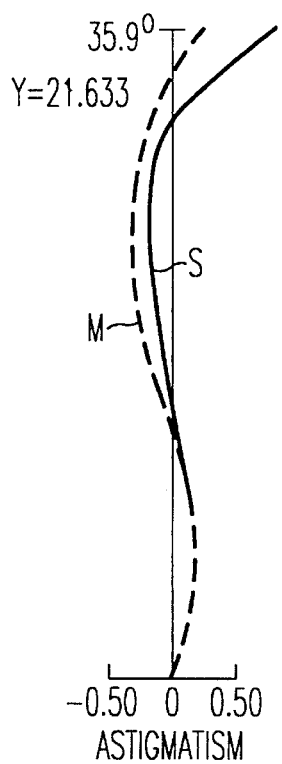
FIG. 5b is an aberrational diagram of the master lens system showing an astigmatism at the first photographing distance (infinite) in accordance with the first embodiment of the present invention.
Figure 5D:
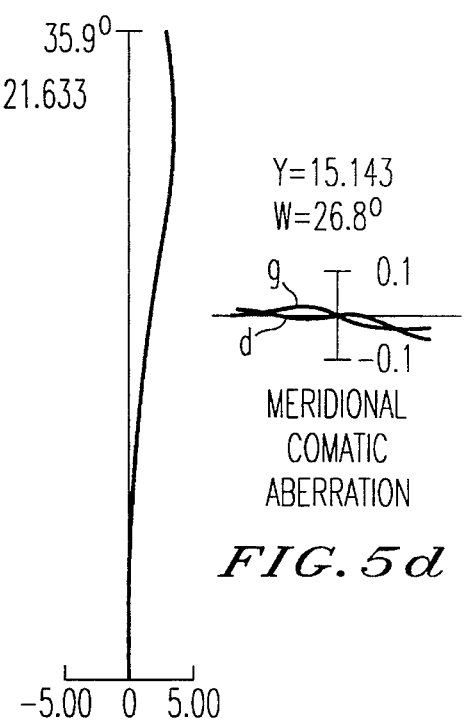
FIG. 5d is an aberrational diagram of the master lens system showing a meridional comatic aberration at the first photographing distance (infinite) in accordance with the first embodiment of the present invention.
Figure 5E:
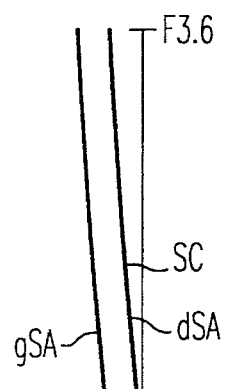
FIG. 5e is an aberrational diagram of the master lens system showing the spherical aberration and a sine condition at a second photographing distance (0.35 m) in accordance with the first embodiment of the present invention.
Figure 5F:
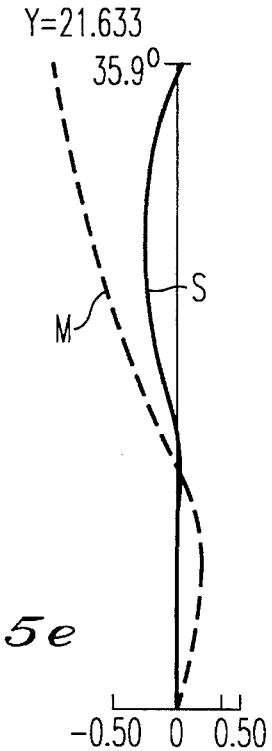
FIG. 5f is an aberrational diagram of the master lens system showing the astigmatism at the second photographing distance (0.35 m) in accordance with the first embodiment of the present invention.
Figure 5H:
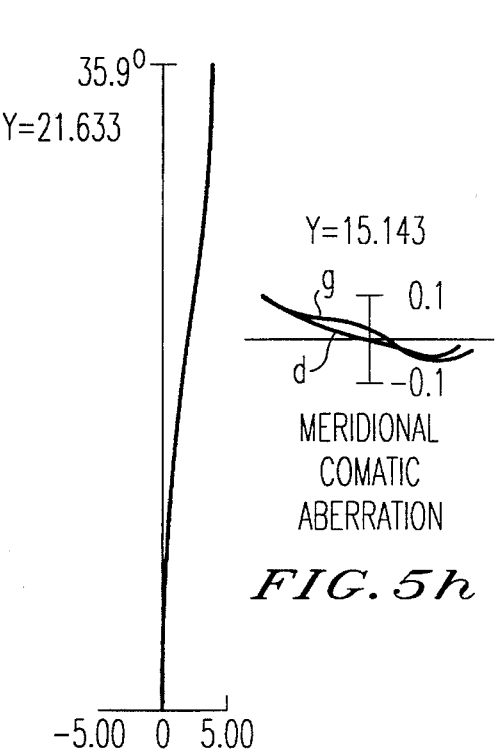
FIG. 5h is an aberrational diagram of the master lens system showing the meridional comatic aberration at the second photographing distance (0.35 m) in accordance with the first embodiment of the present invention.
Figure 6A:
FIG. 6a is an aberrational diagram of the master lens system with the conversion lens system showing the spherical aberration and the sine condition at the first photographing distance (infinite) in accordance with the first embodiment of the present invention.
Figure 6B:
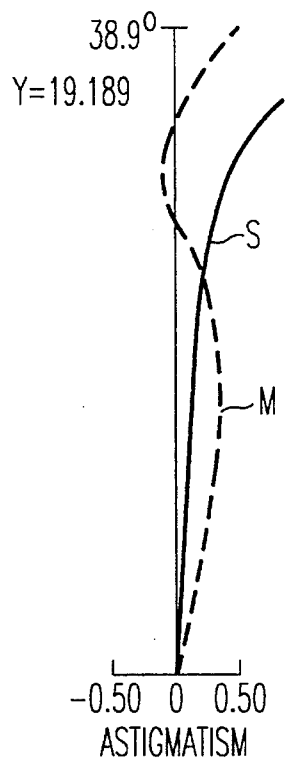
FIG. 6b is an aberrational diagram of the master lens system with the conversion lens system showing the astigmatism at the first photographing distance (infinite) in accordance with the first embodiment of the present invention.
Figure 6D:
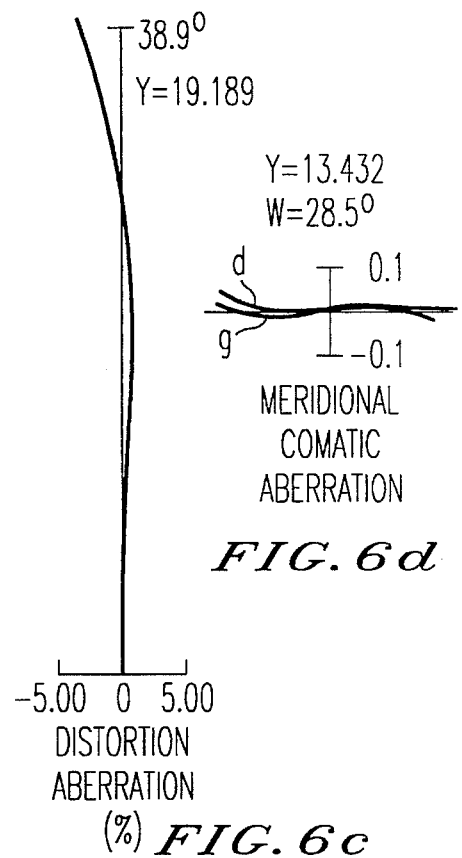
FIG. 6d is an aberrational diagram of the master lens system with the conversion lens system showing the meridional comatic aberration at the first photographing distance (infinite) in accordance with the first embodiment of the present invention.
Figure 6E:
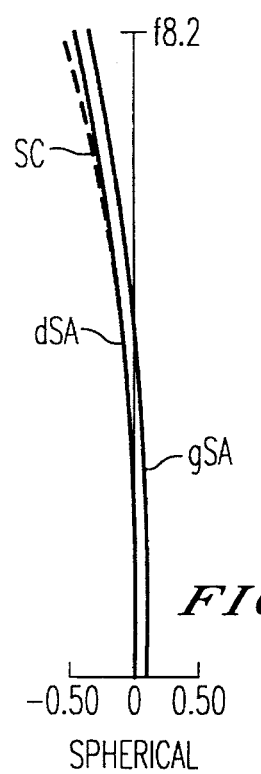
FIG. 6e is an aberrational diagram of the master lens system with the conversion lens system showing the spherical aberration and the sine condition at the second photographing distance (0.35 m) in accordance with the first embodiment of the present invention.
Figure 6F:
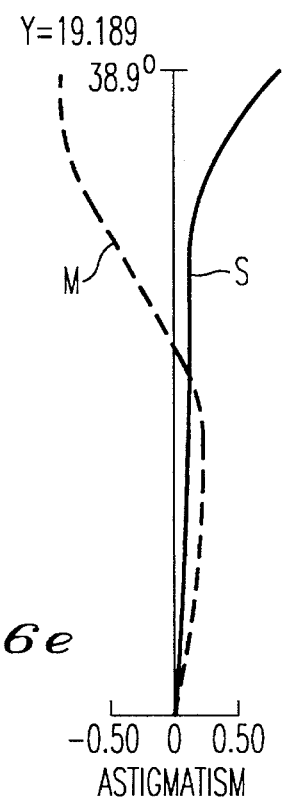
FIG. 6f is an aberrational diagram of the master lens system with the conversion lens system showing the astigmatism at the second photographing distance (0.35 m) in accordance with the first embodiment of the present invention.
Figure 6H:
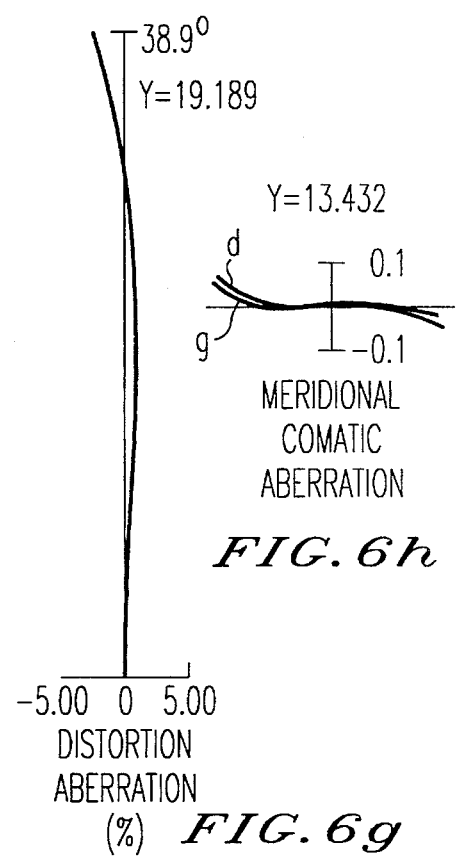
FIG. 6h is an aberrational diagram of the master lens system with the conversion lens system showing the meridional comatic aberration at the second photographing distance (0.35 m) in accordance with the first embodiment of the present invention.

FIGS. 5a–5h and FIGS. 6a–6h show the optical properties of the lens system of the first embodiment of the present invention when incorporating the numerical parameters listed in Table 1a and Table 1b. More particularly, in FIGS. 5a–5h and FIGS. 6a–6h:

FIG. 5a shows an aberrational diagram of the master lens system showing a spherical aberration and a sine condition at a first photographing distance (infinite);

FIG. 5b is an aberrational diagram of the master lens system showing an astigmatism at the first photographing distance (infinite);

FIG. 5c is an aberrational diagram of the master lens system showing a distortion aberration at the first photographing distance (infinite);

FIG. 5d is an aberrational diagram of the master lens system showing a meridional comatic aberration at the first photographing distance (infinite);

FIG. 5e is an aberrational diagram of the master lens system showing the spherical aberration and the sine condition at a second photographing distance (0.35 m);

FIG. 5f is an aberrational diagram of the master lens system showing the astigmatism at the second photographing distance (0.35 m);

FIG. 5g is an aberrational diagram of the master lens system showing the distortion aberration at the second photographing distance (0.35 m);

FIG. 5h is an aberrational diagram of the master lens system showing the meridional comatic aberration at the second photographing distance (0.35 m);

FIG. 6a is an aberrational diagram of the master lens system with the conversion lens system showing the spherical aberration and the sine condition at the first photographing distance (infinite);

FIG. 6b is an aberrational diagram of the master lens system with the conversion lens system showing the astigmatism at the first photographing distance (infinite);

FIG. 6c is an aberrational diagram of the master lens system with the conversion lens system showing the distortion aberration at the first photographing distance (infinite);

FIG. 6d is an aberrational diagram of the master lens system with the conversion lens system showing the meridional comatic aberration at the first photographing distance (infinite);

FIG. 6e is an aberrational diagram of the master lens system with the conversion lens system showing the spherical aberration and the sine condition at the second photographing distance (0.35 m);

FIG. 6f is an aberrational diagram of the master lens system with the conversion lens system showing the astigmatism at the second photographing distance (0.35 m);

FIG. 6g is an aberrational diagram of the master lens system with the conversion lens system showing the distortion aberration at the second photographing distance (0.35 m);

FIG. 6h is an aberrational diagram of the master lens system with the conversion lens system showing the meridional comatic aberration at the second photographing distance (0.35 m).

In each of these aberrational diagrams, dSA shows spherical aberration on d-line, gSA shows spherical aberration on g-line, SC shows a sine condition, Reference numerals S show a sagittal image surface and Reference numerals M show a meridional image surface.

The above aberrations are preferably corrected so that performance of the lens system is preferable.

Second Embodiment

Figure 2A:
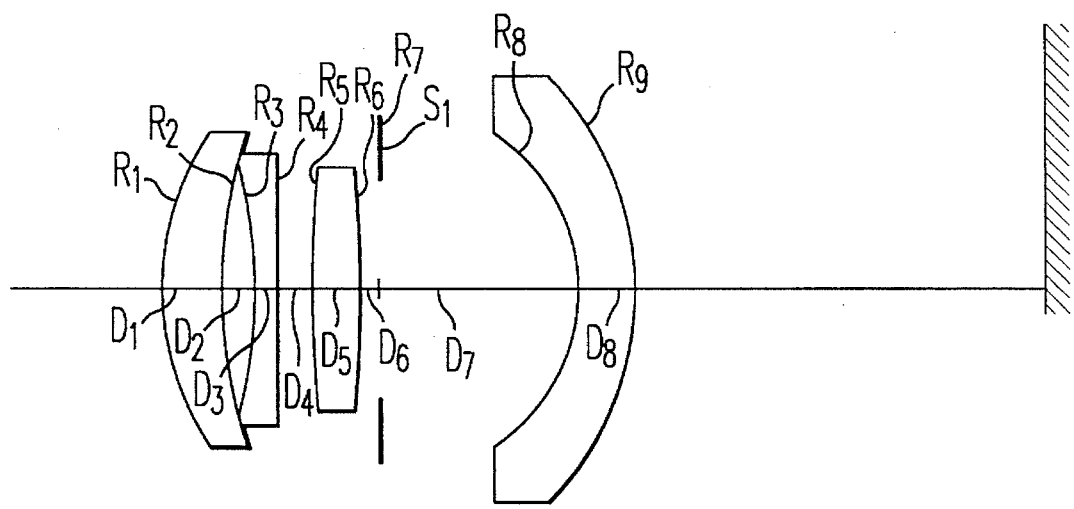
FIG. 2a shows a sectional view illustrating a composition of the master lens system in accordance with a second embodiment of the present invention.
Figure 2B:
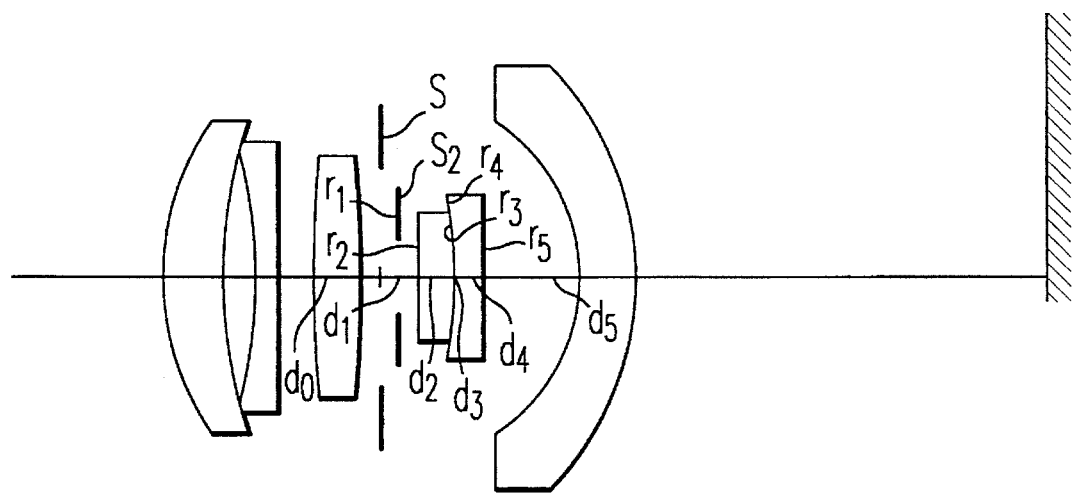
FIG. 2b shows a sectional view illustrating a composition of the master lens system with the conversion lens system inserted therein in accordance with the second embodiment of the present invention.

Numeric values of the above-mentioned parameters of the lens system shown in FIG. 2a, 2b are set in a following Tables 2a and 2b, which correspond to the embodiment of the present invention in which FIG. 2a shows a sectional view illustrating composition of a master lens system and FIG. 2b shows a sectional view illustrating composition of the master lens system with the conversion lens system inserted therein according to a second embodiment of the present invention.

TABLE 2a

Master Lens System
F = 30.0,   F/No = 3.6,   ω = 35.2

| i | $R_i$ | $D_i$ | j | $N_j$ | $v_j$ |
|---|---|---|---|---|---|
| 1 | 9.126 | 1.616 | 1 | 1.73400 | 51.05 |
| 2 | 16.489 | 1.040 | | | |
| 3 | −21.617 | 0.815 | 2 | 1.84666 | 23.78 |
| 4 | 95.464 | 1.489 | | | |
| 5 | 28.794 | 1.690 | 3 | 1.80450 | 39.64 |
| 6 | −23.816 | 0.500 | | | |
| 7 | ∞ (S1) | 6.798 | | | |
| 8 | −5.723 | 1.678 | 4 | 1.49154 | 57.82 |
| 9 | −9.546 | | | | |

TABLE 2a-continued

Master Lens System
F = 30.0,   F/No = 3.6,   ω = 35.2

| i | $R_i$ | $D_i$ | j | $N_j$ | $v_j$ |
|---|---|---|---|---|---| aspherical surface, 8th surface (R8)

K = −0.20650  A = −1.214E-4,  B = −1.374E-5,
C = 7.152E-7,  D = −2.525E-8,  $\delta_4$ = −0.0074
protrusion amount for photographing distance
photographing distance = 0.35 m,
protrusion amount = 3.187

TABLE 2b

Conversion Lens System
F = 24.7   F/No = 8.2   ω = 39.0

| m | $r_m$ | $d_m$ | l | $n_l$ | $v_l$ |
|---|---|---|---|---|---|
| 0 | | 0.500 | | | 23.78 |
| 1 | ∞ (S2) | 0.928 | | | |
| 2 | −34.150 | 1.258 | 1 | 1.88300 | 40.80 |
| 3 | −8.641 | 0.100 | | | |
| 4 | −9.511 | 0.800 | 2 | 1.58500 | 29.30 |
| 5 | 138.527 | 3.212 | | | | aspherical surface, 5th surface (r5)

K = 2178.000,  A = 1.738E-4,  B = −1.580E-4,
C = 2.535E-5,  D = −1.619E-6,  $\delta_c$ = −0.0028
protrusion amount for photographing distance
photographing distance = 0.35 m,
protrusion amount = 2.07

FIGS. 7a–7h and FIGS. 8a–8h show the optical properties of the lens system of the second embodiment of the present invention when incorporating the numberical parameters listed in Table 2a and Table 2b. More particularly, in FIGS. 7a–7h and 8a–8h:

FIG. 7a is an aberrational diagram of the master lens system showing a spherical aberration and a sine condition at a first photographing distance (infinite);

FIG. 7b is an aberrational diagram of the master lens system showing an astigmatism at the first photographing distance (infinite);

FIG. 7c is an aberrational diagram of the master lens system showing a distortion aberration at the first photographing distance (infinite);

FIG. 7d is an aberrational diagram of the master lens system showing a meridional comatic aberration at the first photographing distance (infinite);

FIG. 7e is an aberrational diagram of the master lens system showing the spherical aberration and the sine condition at a second photographing distance (0.35 m);

FIG. 7f is an aberrational diagram of the master lens system showing the astigmatism at the second photographing distance (0.35 m);

FIG. 7g is an aberrational diagram of the master lens system showing the distortion aberration at the second photographing distance (0.35 m);

FIG. 7h is an aberrational diagram of the master lens system showing the meridional comatic aberration at the second photographing distance (0.35 m);

FIG. 8a is an aberrational diagram of the master lens system with the conversion lens system showing the spherical aberration and the sine condition at the first photographing distance (infinite);

FIG. 8b is an aberrational diagram of the master lens system with the conversion lens system showing the astigmatism at the first photographing distance (infinite);

FIG. 8c is an aberrational diagram of the master lens system with the conversion lens system showing the distortion aberration at the first photographing distance (infinite);

FIG. 8d is an aberrational diagram of the master lens system with the conversion lens system showing the meridional comatic aberration at the first photographing distance (infinite);

FIG. 8e is an aberrational diagram of the master lens system with the conversion lens system showing the spherical aberration and the sine condition at the second photographing distance (0.35 m);

FIG. 8f is an aberrational diagram of the master lens system with the conversion lens system showing the astigmatism at the second photographing distance (0.35 m);

FIG. 8g is an aberrational diagram of the master lens system with the conversion lens system showing the distortion aberration at the second photographing distance (0.35 m);

FIG. 8h is an aberrational diagram of the master lens system with the conversion lens system showing the meridional comatic aberration at the second photographing distance (0.35 m).

In each of these aberrational diagrams, dSA shows spherical aberration on d-line, gSA shows spherical aberration on g-line, SC shows a sine condition, reference numerals S show a sagittal image surface, and reference numerals M show a meridional image surface.

The above aberrations are preferably corrected so that performance of the lens system is preferable.

Third Embodiment

Figure 3A:
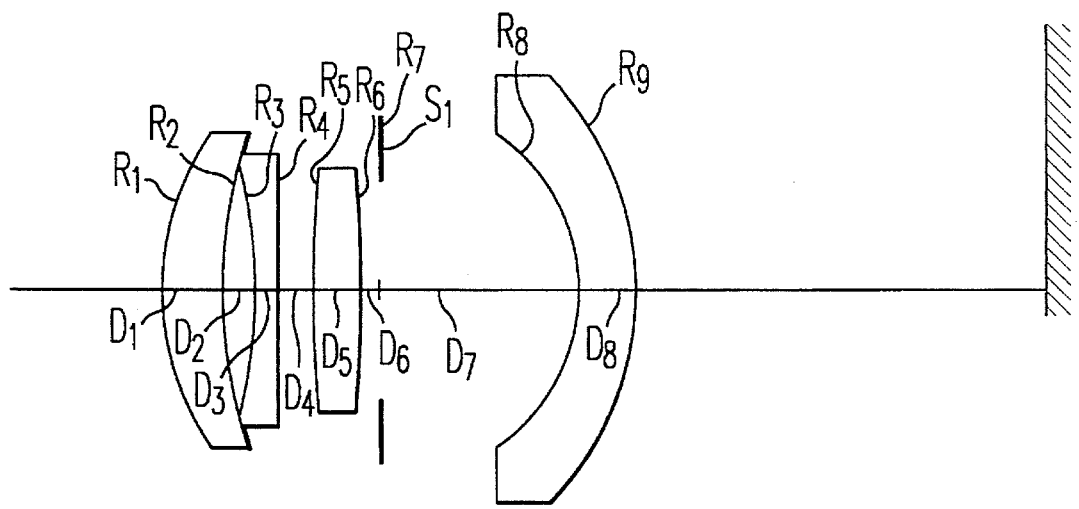
FIG. 3a shows a sectional view illustrating a composition of the master lens system in accordance with a third embodiment of the present invention.
Figure 3B:
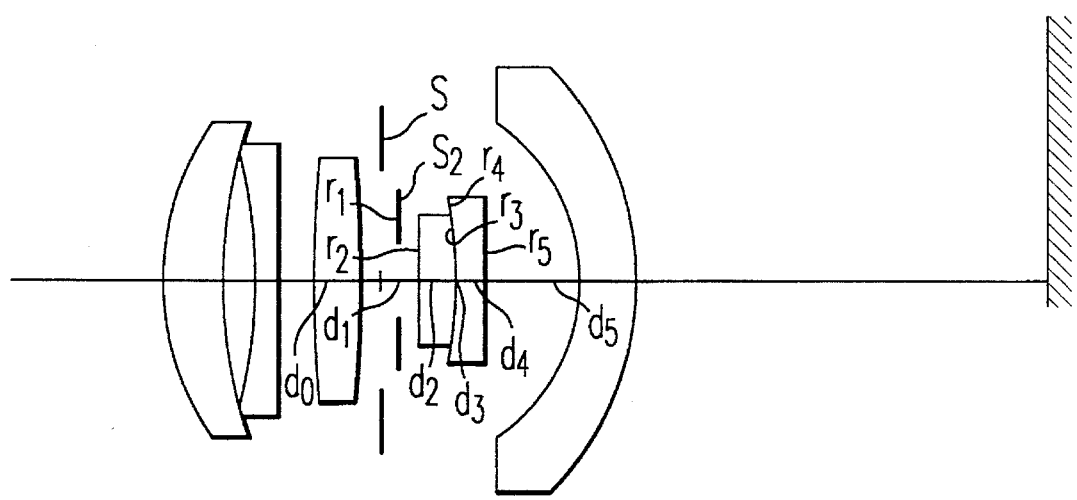
FIG. 3b shows a sectional view illustrating a composition of the master lens system with the conversion lens system inserted therein in accordance with the third embodiment of the present invention.

Numeric values of the above-mentioned parameters of the lens system shown in FIG. 3a, 3b are set in a following Tables 3a and 3b, which correspond to the embodiment in which FIG. 3a shows a sectional view illustrating composition of a master lens system and FIG. 3b shows a sectional view illustrating composition of the master lens system with the conversion lens system inserted therein according to the third embodiment of the present invention.

TABLE 3a

| Master Lens Systems |
| F = 29.9    F/No = 3.6    ω = 35.3 |

| i | $R_i$ | $D_i$ | j | $N_j$ | $v_j$ |
|---|---|---|---|---|---|
| 1 | 9.584 | 1.431 | 1 | 1.88066 | 40.94 |
| 2 | 15.326 | 0.980 | | | |
| 3 | −25.645 | 2.448 | 2 | 1.84700 | 23.90 |
| 4 | 30.168 | 0.776 | | | |
| 5 | 23.579 | 1.307 | 3 | 1.88299 | 40.80 |
| 6 | −26.046 | 0.500 | | | |
| 7 | ∞ (S1) | 6.834 | | | |
| 8 | −6.098 | 2.000 | 4 | 1.49154 | 57.82 |
| 9 | −8.962 | | | | |

| aspherical surface, 8th surface (R8) |

$K = -0.04241$, $A = -1.003\text{E}-5$, $B = -1.469\text{E}-51$
$C = 6.892\text{E}-7$, $D = -2.017\text{E}-8$, $\delta_4 = -0.0828$
protrusion amount for photographing distance
photographing distance = 0.35 m,
protrusion amount = 3.59

TABLE 3b

| Conversion Lens System |
| F = 24.7    F/No = 8.2    ω = 38.9 |

| m | $r_m$ | $d_m$ | l | $n_l$ | $v_l$ |
|---|---|---|---|---|---|
| 0 | | 0.500 | | | |
| 1 | ∞ (S2) | 1.037 | | | |
| 2 | −32.122 | 1.259 | 1 | 1.88033 | 38.84 |
| 3 | −8.697 | 0.100 | | | |
| 4 | −9.551 | 0.800 | 2 | 1.58500 | 29.30 |
| 5 | 237.836 | 3.138 | | | |

| aspherical surface, 5th surface (r5) |

$K = 6711.836$, $A = 3.329\text{E}-4$, $B = -2.179\text{E}-4$,
$C = 3.777\text{E}-5$, $D = -2.389\text{E}-6$, $\delta_c = -0.0011$
protrusion amount for photograhing distance
photographing distance = 0.35 m,
protrusion amount = 2.065

FIGS. 9a–9h and FIGS. 10a–10h, show the optical properties of the lens system of the third embodiment of the present invention when incorporating the numerical parameters listed in Table 3a and Table 3. More particularly, in FIGS. 9a–9h and FIGS. 10a–10h:

FIG. 9a is an aberrational diagram of the master lens system showing a spherical aberration and a sine condition at a first photographing distance (infinite);

FIG. 9b is an aberrational diagram of the master lens system showing an astigmatism at the first photographing distance (infinite);

FIG. 9c is an aberrational diagram of the master lens system showing a distortion aberration at the first photographing distance (infinite);

FIG. 9d is an aberrational diagram of the master lens system showing a meridional comatic aberration at the first photographing distance (infinite);

FIG. 9e is an aberrational diagram of the master lens system showing the spherical aberration and the sine condition at a second photographing distance (0.35 m);

FIG. 9f is an aberrational diagram of the master lens system showing the astigmatism at the second photographing distance (0.35 m);

FIG. 9g is an aberrational diagram of the master lens system showing the distortion aberration at the second photographing distance (0.35 m);

FIG. 9h is an aberrational diagram of the master lens system showing the meridional comatic aberration at the second photographing distance (0.35 m);

FIG. 10a is an aberrational diagram of the master lens system with the conversion lens system showing the spherical aberration and the sine condition at the first photographing distance (infinite);

FIG. 10b is an aberrational diagram of the master lens system with the conversion lens system showing the astigmatism at the first photographing distance (infinite);

FIG. 10c is an aberrational diagram of the master lens system with the conversion lens system showing the distortion aberration at the first photographing distance (infinite);

FIG. 10d is an aberrational diagram of the master lens system with the conversion lens system showing the meridional comatic aberration at the first photographing distance (infinite);

FIG. 10e is an aberrational diagram of the master lens system with the conversion lens system showing the spherical aberration and the sine condition at the second photographing distance (0.35 m);

FIG. 10f is an aberrational diagram of the master lens system with the conversion lens system showing the astigmatism at the second photographing distance (0.35 m);

FIG. 10g is an aberrational diagram of the master lens system with the conversion lens system showing the distortion aberration at the second photographing distance (0.35 m);

FIG. 10h is an aberrational diagram of the master lens system with the conversion lens system showing the meridional comatic aberration at the second photographing distance (0.35 m).

In each of these aberrational diagrams, dSA shows spherical aberration on d-line, gSA shows spherical aberration on g-line, SC shows a sine condition, reference numerals S show a sagittal image surface, and reference numerals M show a meridional image surface.

The above aberrations are preferably corrected so that performance of the lens system is preferable.

Fourth Embodiment

Figure 4A:
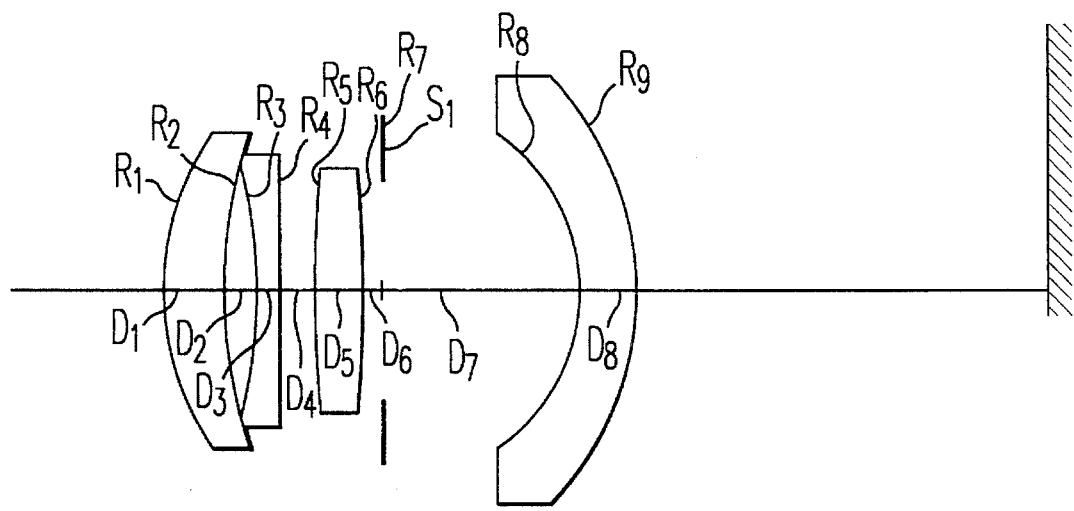
FIG. 4a shows a sectional view illustrating a composition of the master lens system in accordance with a fourth embodiment of the present invention.
Figure 4B:
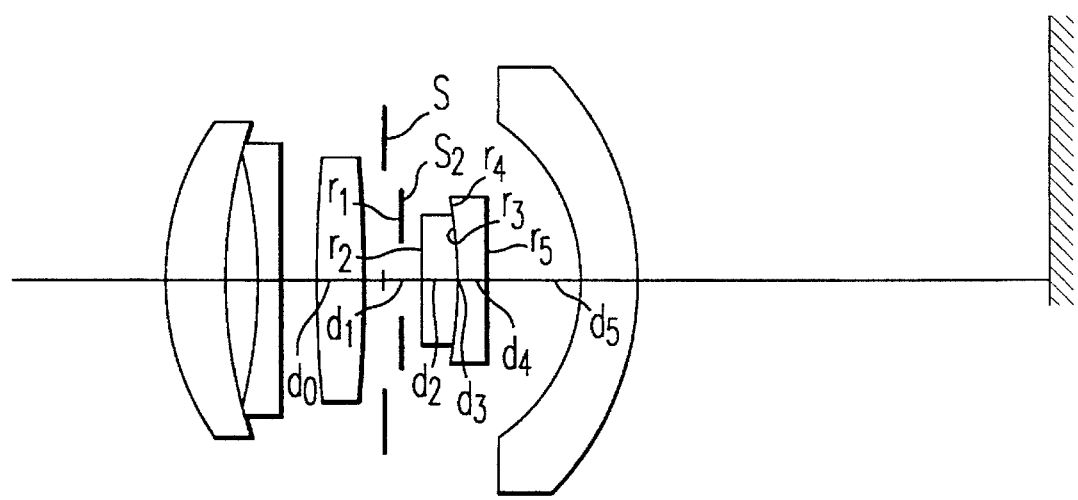
FIG. 4b shows a sectional view illustrating a composition of the master lens system with the conversion lens system inserted therein in accordance with the fourth embodiment of the present invention.

Numeric values of the above-mentioned parameters of the lens system shown in FIG. 4a, 4b are set in the following Tables 4a and 4b, which correspond to the embodiment in which FIG. 4a shows a sectional view illustrating composition of a master lens system and FIG. 4b shows a sectional view illustrating composition of the master lens system with the conversion lens system inserted therein according to a fourth embodiment of the present invention.

TABLE 4a

Master Lens System
F = 29.2   F/No = 3.6,   ω = 35.8

| i | $R_i$ | $D_i$ | j | $N_j$ | $v_j$ |
|---|-------|-------|---|-------|-------|
| 1 | 9.2903 | 2.07 | 1 | 1.73400 | 51.05 |
| 2 | 19.7036 | 0.85 | | | |
| 3 | −24.9490 | 0.80 | 2 | 1.84666 | 23.78 |
| 4 | 38.5000 | 1.54 | | | |
| 5 | 28.7940 | 1.69 | 3 | 1.80450 | 39.64 |
| 6 | −24.0310 | 0.50 | | | |
| 7 | ∞ (S1) | 7.25 | | | |
| 8 | −5.3560 | 0.80 | 4 | 1.49154 | 57.82 |
| 9 | −8.2710 | 15.50 | | | | aspherical surface, 8th surface (R8)

K = −0.12690, A = 4.823E-6, B = −7.972E-6,
C = 4.476E-7, D = −9.964E-9

9th surface (R9)

K = −0.00632, A = 4.92E-6, B = 6.883E-8,
C = 1.205E-10, D = −4.261E-11, $\delta'_4$ = 0.2571
protrusion amount for photographing distance
photographing distance = 0.35 m,
protrusion amount = 3.019

TABLE 4b

Conversion Lens System
F = 24.7   F/No = 8.2   ω = 38.8

| m | $r_m$ | dm | l | $n_1$ | $v_1$ |
|---|-------|------|---|---------|-------|
| 0 | | 0.5 | | | |
| 2 | 0.00000 | 0.61 | | | |
| 3 | −25.56100 | 1.21 | 1 | 1.88300 | 40.80 |
| 4 | −8.36130 | 0.10 | | | |
| 5 | −9.85060 | 0.80 | 2 | 1.58500 | 29.30 |
| 6 | 239.97500 | 4.03 | | | |

TABLE 4b-continued

Conversion Lens System
F = 24.7   F/No = 8.2   ω = 38.8

| m | $r_m$ | dm | l | $n_1$ | $v_1$ |
|---|-------|------|---|---------|-------| aspherical surface, 5th surface (r5)

K = 7982.0000, A = 5.551E-4, B = −3.602E-4,
C = 6.661E-5, D = −4.622E-6, $\delta_c$ = −0.0031
protrusion amount for photographing distance
photographing distance = 0.35 m,
protrusion amount = 2.075

FIGS. 11a–11h and FIG. 12a–12h, show the optical properties of the lens system of the fourth embodiment of the present invention when incorporating the numerical parameters listed in Table 4a and Table 4b. More particularly, in FIGS. 11a–11h and 12a–12h:

FIG. 11a is an aberrational diagram of the master lens system showing a spherical aberration and a sine condition at a first photographing distance (infinite);

FIG. 11b is an aberrational diagram of the master lens system showing an astigmatism at the first photographing distance (infinite);

FIG. 11c is an aberrational diagram of the master lens system showing a distortion aberration at the first photographing distance (infinite);

FIG. 11d is an aberrational diagram of the master lens system showing a meridional comatic aberration at the first photographing distance (infinite);

FIG. 11e is an aberrational diagram of the master lens system showing the spherical aberration and the sine condition at a second photographing distance (0.35 m);

FIG. 11f is an aberrational diagram of the master lens system showing the astigmatism at the second photographing distance (0.35 m);

FIG. 11g is an aberrational diagram of the master lens system showing the distortion aberration at the second photographing distance (0.35 m);

FIG. 11h is an aberrational diagram of the master lens system showing the meridional comatic aberration at the second photographing distance (0.35 m).

FIG. 12a is an aberrational diagram of the master lens system with the conversion lens system showing the spherical aberration and the sine condition at the first photographing distance (infinite);

FIG. 12b is an aberrational diagram of the master lens system with the conversion lens system showing the astigmatism at the first photographing distance (infinite);

FIG. 12c is an aberrational diagram of the master lens system with the conversion lens system showing the distortion aberration at the first photographing distance (infinite);

FIG. 12d is an aberrational diagram of the master lens system with the conversion lens system showing the meridional comatic aberration at the first photographing distance (infinite);

FIG. 12e is an aberrational diagram of the master lens system with the conversion lens system showing the spherical aberration and the sine condition at the second photographing distance (0.35 m);

FIG. 12f is an aberrational diagram of the master lens system with the conversion lens system showing the astigmatism at the second photographing distance (0.35 m);

FIG. 12g is an aberrational diagram of the master lens system with the conversion lens system showing the distortion aberration at the second photographing distance (0.35 m);

FIG. 12h is an aberrational diagram of the master lens system with the conversion lens system showing the meridional comatic aberration at the second photographing distance (0.35 m).

In each of these aberrational diagrams, dSA shows spherical aberration on d-line, gSA shows spherical aberration on g-line, SC shows a sine condition, reference numerals S shows a sagittal image surface, and reference numerals M shows a meridional image surface.

The above aberrations are preferably corrected so that performance of the lens system is preferable.

Referring to FIGS. 13a, 13b, as one further feature of the present invention, a portion 4p outside of a valid focusing range 4v in the fourth lens 4 of the master lens system is cut out from the fourth lens 4. The portion 4p is provided as a space for inserting and removing the conversion lens system.

Figure 14A:
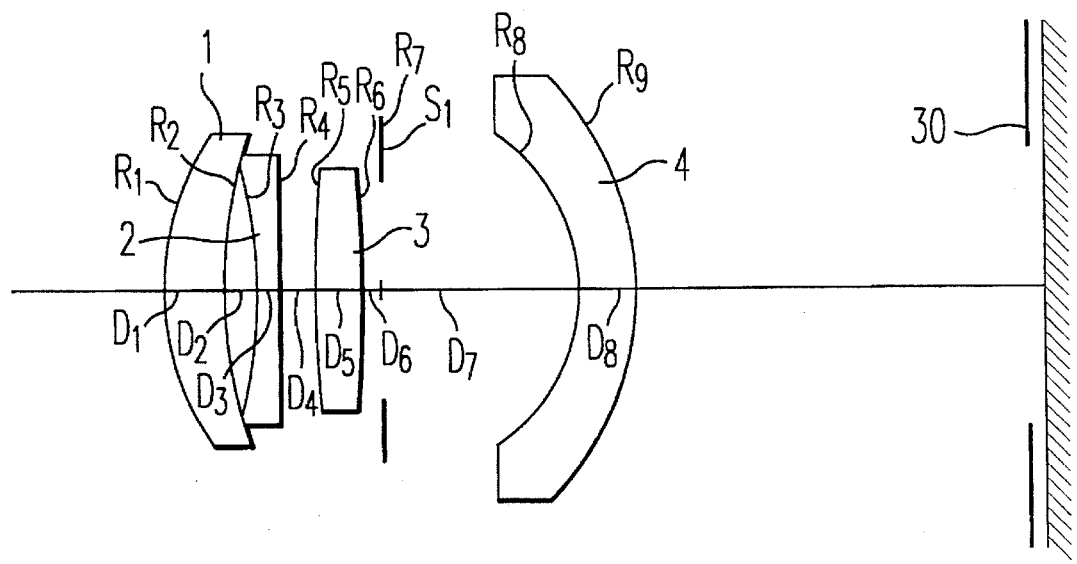
FIG. 14a shows a sectional view explaining a modified example of the composition of the master lens system having a super wide angle in accordance with the first embodiment of the present invention.
Figure 14B:
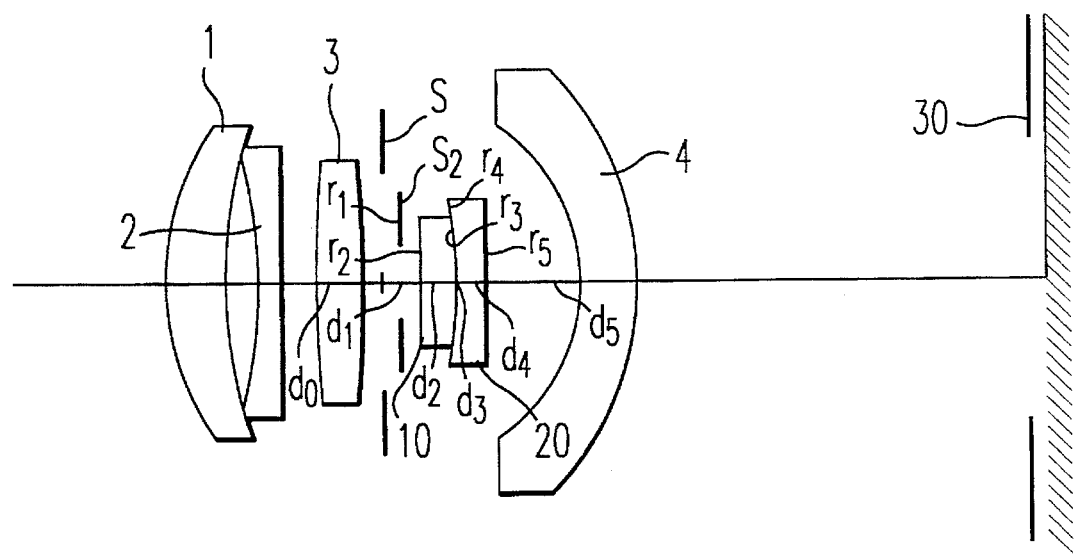
FIG. 14b shows a sectional view explaining a modified example of the composition of the master lens system with the conversion lens system inserted therein having a super wide angle in accordance with the first embodiment of the present invention.

Referring to FIG. 14a, a further embodiment of the present invention in which the master lens system has a super wide angle, which is a panoramic photographing mode, is shown. Referring to FIG. 14b, the master lens system with the conversion lens system has the super wide angle, which is a panoramic photographing mode. A third diaphragm 30 is arranged after a final lens surface of the fourth lens 4 of the master lens system. The third diaphragm 30 is formed in the shape of a rectangular opening. An opening width of the third diaphragm 30 in a short side direction is set such that no light beam focused and formed.

In the panoramic photographing mode, a photographing operation is performed by interrupting one portion of a film with the third diaphragm 30.

Obviously numerous additional modifications and variations of the present invention are possible in light of the above teachings. It is therefore to be understood that within the scope of the appended claims, the invention may be practiced otherwise than as specifically described herein.

What is claimed is as new and is desired to be secured by Letters Patent of the United States is:

1. A lens system comprising:

a master lens system comprising a first lens, a second lens, a third lens, and a fourth lens, which are sequentially arranged from an object side of said lens system to an image side thereof, and a first diaphragm which is arranged between said third lens and said fourth lens, wherein said first lens is a positive meniscus lens having a convex surface toward the object side, said second lens is a negative lens, said third lens is a positive lens, and said fourth lens is a negative meniscus lens having a concave surface toward the object side; and a conversion lens system, wherein said conversion lens system is arranged in such a manner that said conversion lens system can be inserted and removed between said third lens and said fourth lens of the master lens system, and wherein when said conversion lens system is inserted and removed between said third lens and said fourth lens of the master lens system, relative positions of said respective first, second, third and fourth lenses of the master lens system are fixed, and a focal length of said lens system becomes shorter than a focal length of said master lens system.

2. A lens system according to claim 1, wherein said conversion lens system is inserted and removed between said first diaphragm and said fourth lens.

3. A lens system according to claim 1, wherein a surface on the object side of said fourth lens of said master lens system is aspherical.

4. A lens system according to claim 1, wherein when said conversion lens system is removed from said master lens system, said master lens system shifts in a direction of the optical axis for focusing, and wherein when said conversion lens system is inserted into said master lens system, said lens system with said master lens system and said conversion lens system shift in the direction of the optical axis for focusing.

5. A lens system according to claim 1, wherein said conversion lens system comprising a fifth lens and a sixth lens, which are sequentially arranged from the object side of said lens system to the image side thereof, said fifth lens being a positive lens and said sixth lens being a negative lens.

6. A lens system according to claim 3, wherein said aspherical surface of said fourth lens is shaped such that as a distance from the optical axis in the direction perpendicular to the optical axis increases, a curvature ratio of said aspherical surface increases, and a shifting amount $\delta_4$, which is a deviation from an ideal spherical surface in a peripheral portion of said fourth lens, satisfies the following relationship:

$$0.05 < \delta_4 < 0.4.$$

7. A lens system according to claim 3, wherein said aspherical surface of said fourth lens is shaped in such that as a distance from the optical axis in the direction perpendicular to the optical axis increases a curvature ratio of said aspherical surface decreases, and a shifting amount $\delta'_4$, which is a deviation from an ideal spherical surface in a peripheral portion of said fourth lens, satisfies the following relationships:

$$0.05 < \delta'_4 < 0.3.$$

8. A lens system comprising:

a master lens system comprising a first lens, a second lens, a third lens, and a fourth lens, which are sequentially arranged from an object side of said lens system to an image side thereof, and a first diaphragm which is arranged between said third lens and said fourth lens, wherein said first lens is a positive meniscus lens having a convex surface toward the object side, said second lens is a negative lens, said third lens is a positive lens, and said fourth lens is a negative meniscus lens having a concave surface toward the object side; and a conversion lens system, wherein said conversion lens system is arranged in such a manner that said conversion lens system can be inserted and removed between said third lens and said fourth lens of the master lens system, wherein when said conversion lens system is inserted and removed between said third lens and said fourth lens of the master lens system, relative positions of said respective first, second, third and fourth lenses of the master lens system are fixed, and a focal length of said lens system becomes shorter than a focal length of said master lens system, and wherein when said conversion lens system is inserted between said third lens and said fourth lens, a maximum diaphragm diameter of said first diaphragm is reduced.

9. A lens system comprising:

a master lens system comprising a first lens, a second lens, a third lens, and a fourth lens, which are sequentially arranged from an object side of said lens system to an image side thereof, and a first diaphragm which is arranged between said third lens and said fourth lens, wherein said first lens is a positive meniscus lens having a convex surface toward the object side, said second lens is a negative lens, said third lens is a positive lens, and said fourth lens is a negative meniscus lens having a concave surface toward the object side; and a conversion lens system, wherein said conversion lens system is arranged in such a manner that said conversion lens system can be inserted and removed between said third lens and said fourth lens of the master lens system, wherein when said conversion lens system is inserted and removed between said third lens and said fourth lens of the master lens system, relative positions of said respective first, second, third and fourth lenses of the master lens system are fixed, and a focal length of said lens system becomes shorter than a focal length of said master lens system, wherein said conversion lens system further comprises a fixed second diaphragm on the object side, and wherein a diaphragm diameter of said fixed second diaphragm is smaller than a maximum diaphragm diameter of said first diaphragm.

10. A lens system comprising:

a master lens system comprising a first lens, a second lens, a third lens, and a fourth lens, which are sequentially arranged from an object side of said lens system to an image side thereof, and a first diaphragm which is arranged between said third lens and said fourth lens, wherein said first lens is a positive meniscus lens having a convex surface toward the object side, said second lens is a negative lens, said third lens is a positive lens, and said fourth lens is a negative meniscus lens having a concave surface toward the object side; and a conversion lens system, wherein said conversion lens system is arranged in such a manner that said conversion lens system can be inserted and removed between said third lens and said fourth lens of the master lens system, wherein when said conversion lens system is inserted and removed between said third lens and said fourth lens of the master lens system, relative positions of said respective first, second, third and fourth lenses of the master lens system are fixed, and a focal length of said lens system becomes shorter than a focal length of said master lens system, and wherein a cut-out portion outside of a focusing range in said fourth lens of said master lens system is cut-out from said fourth lens, said cut-out portion is provided as a space for inserting and removing said conversion lens system.

11. A lens system comprising:

a master lens system comprising a first lens, a second lens, a third lens, and a fourth lens, which are sequentially arranged from an object side of said lens system to an image side thereof, and a first diaphragm which is arranged between said third lens and said fourth lens, wherein said first lens is a positive meniscus lens having a convex surface toward the object side, said second lens is a negative lens, said third lens is a positive lens, and said fourth lens is a negative meniscus lens having a concave surface toward the object side; and a conversion lens system, wherein said conversion lens system is arranged in such a manner that said conversion lens system can be inserted and removed between said third lens and said fourth lens of the master lens system, wherein when said conversion lens system is inserted and removed between said third lens and said fourth lens of the master lens system, relative positions of said respective first, second, third and fourth lenses of the master lens system are fixed, and a focal length of said lens system becomes shorter than a focal length of said master lens system, and wherein at least one surface of said conversion lens system is aspherical.

12. A lens system according to claim 11, wherein a surface on the sixth lens of the conversion lens system is aspherical, said aspherical surface of said sixth lens in said conversion lens system is shaped such that as a distance from the optical axis to a middle point of said surface of said second lens in the direction perpendicular to the optical axis increases a curvature ratio of said aspherical surface increases, after said middle point of said surface of said second lens, said aspherical surface intersects an ideal spherical surface of said second lens, and as a distance from said middle point to a peripheral of said surface of said second lens in the direction perpendicular to the optical axis increases, the curvature ratio of said aspherical surface decreases, and a shifting amount $\delta_c$, which is a deviation from the ideal spherical surface in a peripheral portion of said sixth lens, satisfies the following relationships:

$0.001 < \delta_c < 0.005$.

* * * * *